US012761470B2

(12) United States Patent
Aiki et al.

(10) Patent No.: US 12,761,470 B2
(45) Date of Patent: Oct. 13, 2026

(54) DISPLAY APPARATUS

(71) Applicant: SONY SEMICONDUCTOR SOLUTIONS CORPORATION, Kanagawa (JP)

(72) Inventors: Kazuma Aiki, Kanagawa (JP); Satoshi Imai, Kanagawa (JP); Hiroshi Mukawa, Kanagawa (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 248 days.

(21) Appl. No.: 18/294,181

(22) PCT Filed: Feb. 9, 2022

(86) PCT No.: PCT/JP2022/005025

§ 371 (c)(1),
(2) Date: Feb. 1, 2024

(87) PCT Pub. No.: WO2023/026515

PCT Pub. Date: Mar. 2, 2023

(65) Prior Publication Data

US 2024/0337830 A1 Oct. 10, 2024

(30) Foreign Application Priority Data

Aug. 24, 2021 (JP) ................................ 2021-136580

(51) Int. Cl.

| | |
|---|---|
| ***G02B 27/00*** | (2006.01) |
| ***G02B 6/42*** | (2006.01) |
| ***G02B 27/01*** | (2006.01) |

(52) U.S. Cl.

CPC ....... *G02B 27/0018* (2013.01); *G02B 6/4214* (2013.01); *G02B 27/0172* (2013.01); *G02B 2027/012* (2013.01)

(58) Field of Classification Search

CPC .............. G02B 27/0018; G02B 6/4214; G02B 27/0172; G02B 2027/012

(Continued)

(56) References Cited

U.S. PATENT DOCUMENTS

| | | | | |
|---|---|---|---|---|
| 8,760,762 | B1 | 6/2014 | Kelly et al. | |
| 2017/0322417 | A1* | 11/2017 | Sekiguchi ................ | G02B 5/09 |
| 2021/0080729 | A1 | 3/2021 | Ha | |

FOREIGN PATENT DOCUMENTS

| | | | |
|---|---|---|---|
| CN | 112130332 | A | 12/2020 |
| EP | 3761103 | A1 | 1/2021 |

(Continued)

OTHER PUBLICATIONS

International Search Report and Written Opinion of PCT Application No. PCT/JP2022/005025, issued on Mar. 29, 2022, 09 pages of ISRWO.

*Primary Examiner* — William Choi
(74) *Attorney, Agent, or Firm* — CHIP LAW GROUP

(57) ABSTRACT

Provided is a display apparatus that includes an image light generation apparatus that generates image light and a light guide plate that guides the image light from the image light generation apparatus to an eyeball. The light guide plate includes a light guide plate main body including a light incident surface upon which the image light enters, and an optical surface group including a plurality of optical surfaces that guides the image light via the light incident surface. The light guide plate includes at least one reflection surface that is provided inside the light guide plate main body and reflects the image light via the optical surface group to a side of the eyeball, and at least one light-shielding portion that is provided in the light guide plate main body and shields a stray light component of the image light.

26 Claims, 18 Drawing Sheets

(58) Field of Classification Search
USPC ........................................... 359/630; 345/7–9
See application file for complete search history.

(56) References Cited

FOREIGN PATENT DOCUMENTS

| | | | | |
|---|---|---|---|---|
| JP | 2001-290102 | A | | 10/2001 |
| JP | 2006126875 | A | * | 5/2006 |
| JP | 2011-053367 | A | | 3/2011 |
| JP | 2016-110782 | A | | 6/2016 |

* cited by examiner

DISPLAY APPARATUS

CROSS REFERENCE TO RELATED APPLICATIONS

This application is a U.S. National Phase of International Patent Application No. PCT/JP2022/005025 filed on Feb. 9, 2022, which claims priority benefit of Japanese Patent Application No. JP 2021-136580 filed in the Japan Patent Office on Aug. 24, 2021. Each of the above-referenced applications is hereby incorporated herein by reference in its entirety.

TECHNICAL FIELD

A technology according to the present disclosure (hereinafter, also referred to as "the present technology") relates to a display apparatus.

BACKGROUND ART

Conventionally, there is known a display apparatus that guides image light to an eyeball of an observer through a light guide plate having a reflection surface inside it and displays an image (e.g., see Patent Literature 1).

CITATION LIST

Patent Literature

Patent Literature 1: Japanese Patent Application Laid-open No. 2011-53367

DISCLOSURE OF INVENTION

Technical Problem

However, the conventional display apparatus has a room for improvement for preventing unwanted images from being visually recognized by an observer and other people.

In view of this, the present technology provides a display apparatus capable of preventing unwanted images from being visually recognized by an observer and other people.

Solution to Problem

The present technology provides a display apparatus, including:

- an image light generation apparatus that generates image light; and
- a light guide plate that guides the image light from the image light generation apparatus to an eyeball, in which
- the light guide plate includes
  - a light guide plate main body including
    - a light incident surface upon which the image light enters, and
    - an optical surface group including a plurality of optical surfaces that guides the image light via the light incident surface,
  - at least one reflection surface that is provided inside the light guide plate main body and reflects the image light via the optical surface group to a side of the eyeball, and
  - at least one light-shielding portion that is provided in the light guide plate main body and shields a stray light component of the image light.

The light-shielding portion may be provided inside the light guide plate main body.

The light-shielding portion may be located between a virtual surface and the light incident surface, the virtual surface including the reflection surface.

The stray light component may be light of the image light, the light excluding light that is guided to the reflection surface via the light incident surface and the optical surface group.

The light-shielding portion may be located at a position deviated from an optical path of the image light between the light incident surface and the optical surface group.

At least a portion of the light-shielding portion may be located between the light incident surface and the reflection surface.

The light-shielding portion may be provided at least on a back side of the reflection surface.

The plurality of optical surfaces may include a first optical surface that totally internally reflects the image light via the light incident surface, and a second optical surface that faces the light incident surface and bends the image light totally internally reflected on the first optical surface toward the reflection surface.

The stray light component may be light of the image light, the light excluding light that enters the first optical surface via the light incident surface within a predetermined angle-of-incidence range satisfying a total internal reflection condition.

The light-shielding portion may be located at a position deviated from an optical path of the image light between the light incident surface and the first optical surface.

The at least one reflection surface may be a plurality of reflection surfaces arranged between the light incident surface and the second optical surface in a direction in which the light incident surface and the second optical surface face each other, and the light-shielding portion may be located between a virtual surface and the light incident surface, the virtual surface including a reflection surface closest to the light incident surface among the plurality of reflection surfaces.

The light guide plate main body further may include a light emission surface that faces the first optical surface and emits the image light via the reflection surface toward the eyeball, and the light-shielding portion may be provided at a position closer to the light emission surface than the first optical surface.

The light guide plate main body may be constituted by a plurality of joined members including first and second members, and the reflection surface and the light-shielding portion may be provided in a joining portion of the first and second members.

The light guide plate main body may be constituted by a plurality of joined members including first and second members, the reflection surface may be provided in a first joining portion of the first and second members, at least a portion of the light-shielding portion may be provided in a second joining portion of the first and second members, and the second joining portion may be located between the light incident surface and the first joining portion.

The light guide plate main body may be constituted by a plurality of joined members including first and second members, the reflection surface may be provided in a first joining portion of the first and second members, at least a portion of the light-shielding portion may be provided between the first joining portion and the second joining portion of the first and second members, and the second joining portion may be located between the light incident surface and the first joining portion.

The second member may include the light incident surface and the first and second optical surfaces, and in the joining portion, joining surfaces of the first and second members which face the light incident surface may be joined to each other via the light-shielding portion.

The plurality of members may include a third member, the third member being joined to the second member and having the second optical surface, the second member may include the light incident surface and the first optical surface, and in the joining portion, joining surfaces of the first and second members which face the light incident surface may be joined to each other via the light-shielding portion.

The second optical surface may be a concave mirror.

The reflection surface may be a plane surface.

The light-shielding portion may absorb at least a portion of the stray light component entering the light-shielding portion.

The light-shielding portion may include paint.

The light-shielding portion may include a metal thin film.

The light-shielding portion may include a light-shielding film.

The light guide plate further may include an incident lens, the incident lens being joined to the light incident surface and allowing the image light to enter the light guide plate main body, the light-shielding film may be arranged in a portion between the light incident surface and the incident lens, and an adhesive layer may be arranged in another portion between the light incident surface and the incident lens.

The light guide plate further may include an incident lens, the incident lens being joined to the light incident surface and allowing the image light to enter the light guide plate main body, the light-shielding film may be arranged in a recess provided in a surface of the incident lens on a side of the light incident surface or in the light incident surface, and an adhesive layer may be arranged between a surface in a periphery of the recess of one of the surface on the side of the light incident surface and the light incident surface, in which the recess is provided, and the light-shielding film and the other of the surface on the side of the light incident surface and the light incident surface, in which the recess is not provided.

The light guide plate further may include an incident lens, the incident lens being joined to the light incident surface and allowing the image light to enter the light guide plate main body, the light-shielding film may be arranged in a portion between the light incident surface and the incident lens, a light-transmitting film may be arranged in another portion between the light incident surface and the incident lens, and an adhesive layer may be arranged between the light-shielding film and the light-transmitting film and the light incident surface and/or between the light-shielding film and the light-transmitting film and the incident lens.

The light-shielding portion may be provided in the light incident surface.

MODE(S) FOR CARRYING OUT THE INVENTION

Hereinafter, favorable embodiments of the present technology will be described in detail with reference to the accompanying drawings. It should be noted that in the present specification and the drawings, components having substantially the same functional configurations will be denoted by the same reference signs and duplicate descriptions thereof will be omitted. The embodiments described below represent typical embodiments of the present technology. The scope of the present technology should not be understood narrowly due to these embodiments. In the present specification, even in a case where it is described that a display apparatus according to the present technology provide a plurality of effects, the display apparatus according to the present technology only need to provide at least one of the effects. The effects described in the present specification are merely exemplary and not limitative and other effects may be provided.

Moreover, descriptions will be given in the following order.

1. Introduction
2. Display Apparatus According to Example 1 of First Embodiment of Present Technology
3. Display Apparatus According to Example 2 of First Embodiment of Present Technology
4. Display Apparatus According to Example 3 of First Embodiment of Present Technology
5. Display Apparatus According to Example 4 of First Embodiment of Present Technology
6. Display Apparatus According to Example 5 of First Embodiment of Present Technology
7. Display Apparatus According to Example 6 of First Embodiment of Present Technology
8. Display Apparatus According to Example 7 of First Embodiment of Present Technology
9. Display Apparatus According to Example 8 of First Embodiment of Present Technology
10. Display Apparatus According to Second Embodiment of Present Technology
11. Display Apparatus According to Third Embodiment of Present Technology
12. Display Apparatus According to Modified Example 1 of Third Embodiment of Present Technology
13. Display Apparatus According to Modified Example 2 of Third Embodiment of Present Technology
14. Display Apparatus According to Modified Example 3 of Third Embodiment of Present Technology
15. Display Apparatus According to Example 1 of Fourth Embodiment of Present Technology
16. Display Apparatus According to Example 2 of Fourth Embodiment of Present Technology
17. Modified Examples of Present Technology

1. Introduction

Conventionally, there is known a display apparatus including a light guide plate having a reflection surface inside it. This display apparatus can use a display which has high efficiency, is a self-light emission-type like, for example, an organic EL display, but hardly achieves high luminance, and can configure a compact display apparatus.

Figure 17:
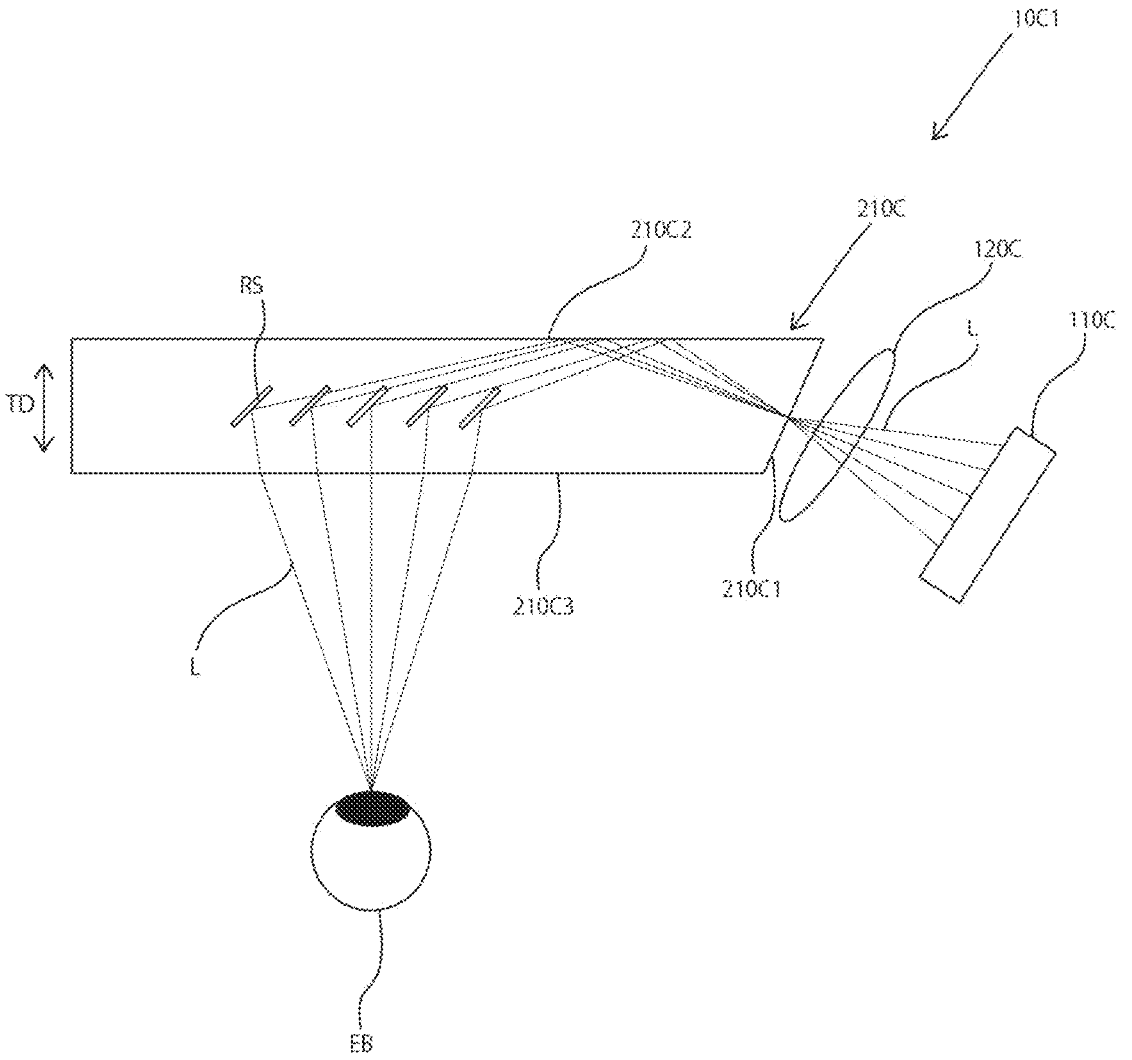
FIG. 17 A cross-sectional view schematically showing a configuration of a display apparatus according to Comparative Example 1.

In a display apparatus 10C1 according to Comparative Example 1 shown in FIG. 17, image light generated by an image light generation apparatus 110C is guided to an eyeball EB of a user who is an observer via a projection optical system 120C and a light guide plate 210C, the light guide plate 210C having a plurality of reflection surfaces RS (combiners) inside it. To be specific, pixel-based light beams L of image light emitted from the image light generation apparatus 110C are collected to a light incident surface 210C1 of the light guide plate 210C in the projection optical system 120C and enter the light guide plate 210C. The light beams L entering the light guide plate 210C are totally internally reflected on a total internal reflection surface 210C2 of the light guide plate 210C, reflected on the reflection surfaces RS, and emitted toward a pupil of the eyeball EB of the observer from the light guide plate 210C. For example, metal thin films, dielectric multi-layer films, total internal reflection surfaces using a refractive index difference, or the like are used as the reflection surfaces RS.

However, in the display apparatus 10C1 according to Comparative Example 1, the light guide plate 210C and the projection optical system 120C are configured as separated members. Therefore, it has a room for improvement for downsizing.

Figure 18:
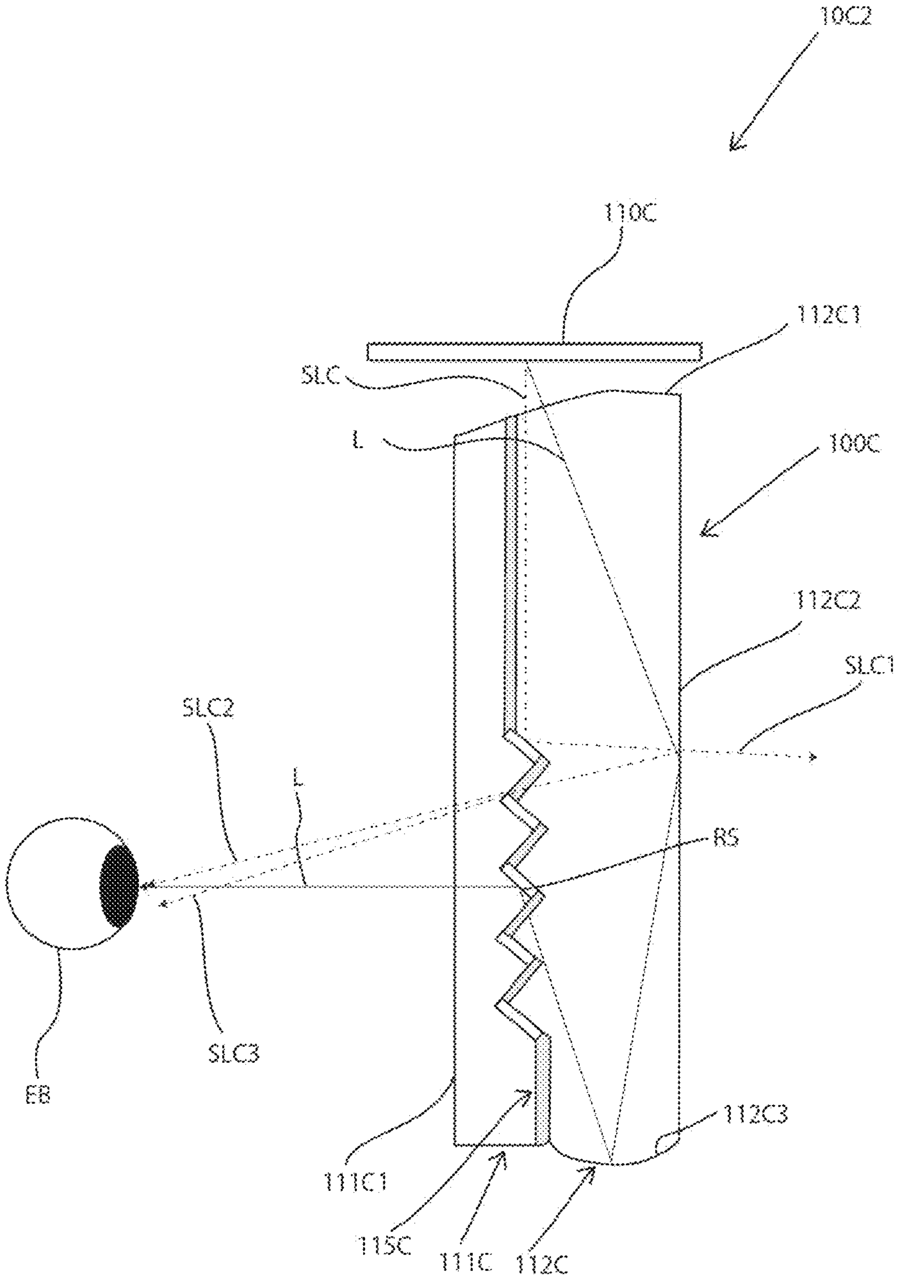
FIG. 18 A cross-sectional view schematically showing a configuration of a display apparatus according to Comparative Example 2.

In a display apparatus 10C2 according to Comparative Example 2 shown in FIG. 18, downsizing is achieved by providing a concave mirror 112C3 as the projection optical system to a light guide plate 100C.

In the display apparatus 10C2 according to Comparative Example 2, pixel-based light beams L of image light emitted from the image light generation apparatus 110C are guided to the eyeball EB of the user via the light guide plate 100C, the light guide plate 100C having a plurality of reflection surfaces RS (combiners) inside it. To be specific, the light beams L enter the light guide plate 100C via a light incident surface 112C1 of the light guide plate 100C. Then, the light beams L are totally internally reflected on a total internal reflection surface 112C2 of the light guide plate 100C, collected on the concave mirror 112C3, and reflected on the reflection surface RS to a side of the eyeball EB of the user.

Regarding the light guide plate 100C, first and second members 111C and 112C joined in a thickness direction via a transparent adhesive layer 115C constitute a light guide plate main body. The plurality of reflection surfaces RS is provided between joining surfaces of the first and second members 111C and 112C. For example, metal thin films, dielectric multi-layer films, total internal reflection surfaces using a refractive index difference, or the like are used as the reflection surfaces RS. In general, a metal coat is used for the concave mirror 112C3. It is because it is difficult to design a concave mirror satisfying a total internal reflection condition. As a matter of course, a concave mirror using an interface with an air layer, for example, may be realized if it can satisfy the total internal reflection condition. Although the light incident surface 112C1 is a curved surface, it may be a plane surface. Spherical surfaces, non-spherical surfaces, toroidal surfaces, anamorphic non-spherical surfaces, or free curved surfaces can be used as the light incident surface (in a case of the curved surface) and the concave mirror.

However, in the display apparatus 10C2 according to Comparative Example 2, downsizing can be achieved while the plurality of reflection surfaces RS functioning as the combiners is arranged near the image light generation apparatus 110C which is strongly emitting light so that the image light from the image light generation apparatus 110C directly enters the light guide plate 100C. Therefore, for example, a stray light component SLC of the image light from the image light generation apparatus 110C enters a back surface of the reflection surface RS via the light incident surface 112C1, is reflected on the back surface to a side (world side) opposite to the side of the eyeball EB of the user, and a portion SLC1 of the stray light component SLC passes through the total internal reflection surface 112C2 and is emitted to the world. Although the user cannot see the stray light component SLC1, other people can see it as if the user's eye was flashing. Thus, the appearance is bad.

On the other hand, another portion SLC2 of the stray light component SLC reflected on the back surface of the reflection surface RS is normally reflected on the total internal reflection surface 112C2, passes through the light guide plate 100C, and enters the pupil of the eyeball EB of the user. The stray light component SLC2 is different from the light beam L to be observed by the user in terms of a virtual-image distance, i.e., an in-focus distance and an angle of incidence upon the pupil of the eyeball EB. Therefore, it is so-called ghost light which can be seen at a position deviated from the light beam L and which is out of focus. It leads to deterioration of image quality.

In addition, when the stray light component SLC2 that is the ghost light is normally reflected on the total internal reflection surface 112C2, passes through the light guide plate 100C, and is emitted toward the eyeball EB, the stray light component SLC2 obliquely enters a joining portion of the first and second members 111C and 112C of the light guide plate 100C. At this time, the stray light component SLC2 obliquely entering the joining portion is split due to dispersion in refraction because of a small refractive index difference between the first and second members 111C and 112C constituting the light guide plate 100C and the adhesive layer 115C (it is difficult to make a refractive index difference between the first and second members 111C and 112C and the adhesive layer 115C zero). Therefore, the stray light component SLC2 is split for each wavelength and the user observes it as a ghost image. It leads to further deterioration of image quality.

That is, the display apparatus 10C2 according to Comparative Example 2 has a room for improvement for preventing unwanted images from being visually recognized by an observer and other people.

In view of this, the inventors has developed a display apparatus according to the present technology as a display apparatus capable of preventing unwanted images from being visually recognized by an observer and other people as a result of intensive studies.

Hereinafter, some embodiments of an image forming apparatus according to the present technology will be described in detail.

2. Display Apparatus According to Example 1 of First Embodiment of Present Technology A display apparatus 10-1 according to Example 1 of the first embodiment of the present technology will be described with reference to the drawings.

<<Configuration of Display Apparatus>>

The display apparatus 10-1 is, as an example, used for providing augmented reality (AR) content or the like to the user.

Figure 1:
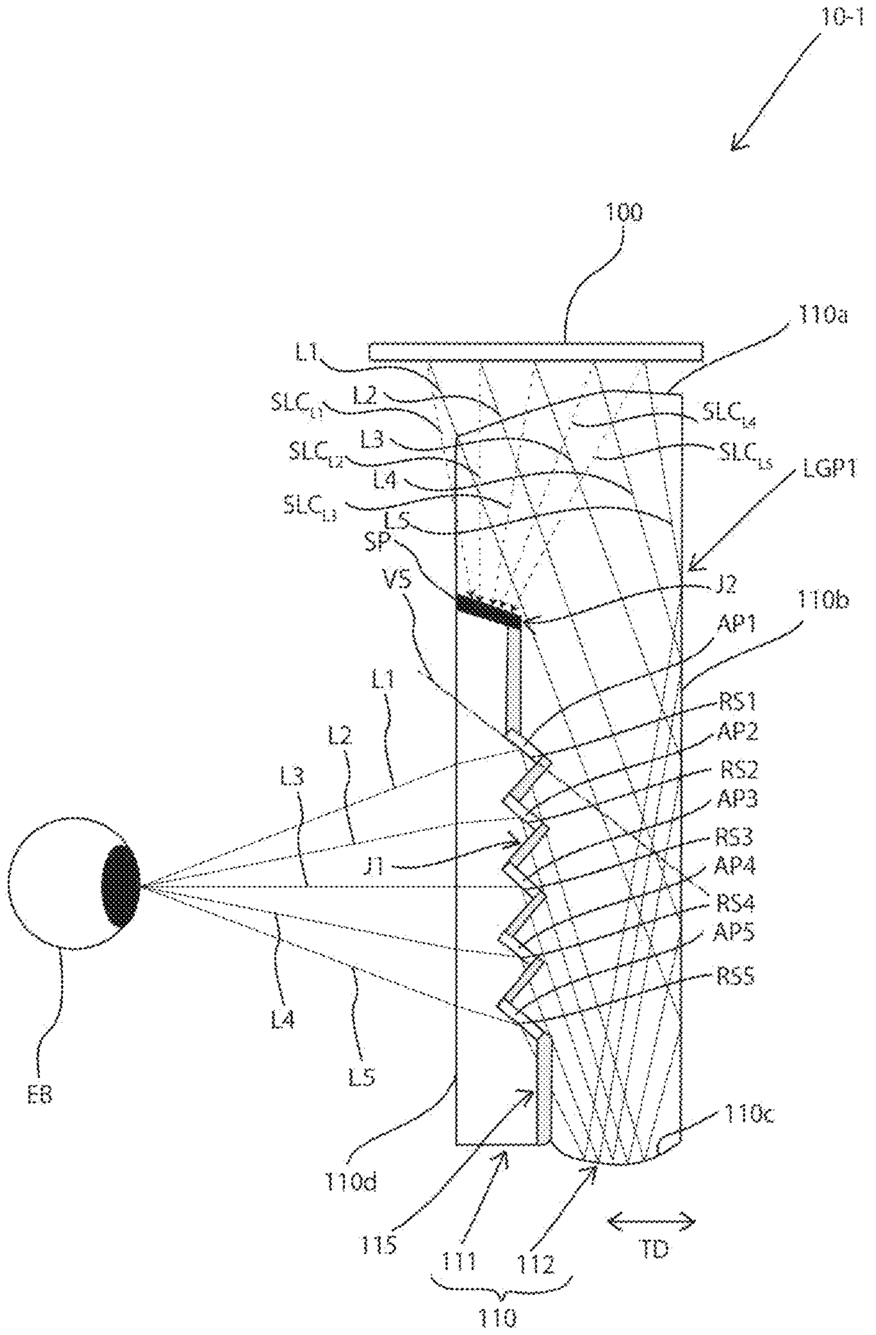
FIG. 1 A cross-sectional view schematically showing a configuration of a display apparatus according to Example 1 of a first embodiment of the present technology.

FIG. 1 is a diagram schematically showing a configuration of the display apparatus 10-1 according to Example 1 of the first embodiment.

The display apparatus 10-1 functions as a head-mounted display (HMD) that is mounted on the user's head (observer) for the use, for example. The HMD is also called, for example, eyewear.

As shown in FIG. 1, the display apparatus 10-1 includes an image light generation apparatus 100 and a light guide plate LGP1. The display apparatus 10-1 can further include a control system that controls the image light generation apparatus 100. The image light generation apparatus 100 and the light guide plate LGP1 are integrally provided in the same support structure (e.g., an eyeglass frame). The control system may be provided integrally with the support structure or may be provided separately from the support structure.

Hereinafter, the description will be given assuming that the eyeglass frame as an example of the support structure is mounted on the user's head.

[Image Light Generation Apparatus]

The image light generation apparatus 100 generates image light. The image light includes, as an example, a plurality of light beams (e.g., L1 to L5) which form different angles of view. Each light beam may be light in single color or may be light in multiple colors (e.g., light in three colors of red, green, and blue).

The image light generation apparatus 100 has an image display panel including a plurality of display elements (pixels) arranged two-dimensionally, for example. Each display element (pixel) may be a self-light emission-type such as a laser, LED, or organic EL element, for example, or may be a light control-type such as a liquid-crystal device (LCD) which requires an additional light source. Each display element is driven by a driving circuit. The driving circuit drives the display elements on the basis of modulation data sent from the control system.

It should be noted that the image light generation apparatus 100 may be a light scanning-type constituted by a light source (e.g., a laser and the like) and a light deflector (e.g., a MEMS mirror, a galvanometer mirror, a polygon mirror, and the like).

[Light Guide Plate]

The light guide plate LGP1 guides image light from the image light generation apparatus 100 to the eyeball. The light guide plate LGP1 may be a type (eyeglass lens-type) fitted in the eyeglass frame as the support structure or may be a type (combiner-type) externally attached to the eyeglass frame.

The light guide plate LGP1 includes a light guide plate main body 110, a plurality of reflection surfaces RS (e.g., reflection surfaces RS1 to RS5) provided inside the light guide plate main body 110, and a light-shielding portion SP provided in the light guide plate main body 110.

(Light Guide Plate Main Body)

The light guide plate main body 110 is, as an example, a plate-like body having light transmittance. The plate-like body is, for example, a transparent or semi-transparent glass or resin.

The light guide plate main body 110 includes a light incident surface 110*a* and an optical surface group. The light incident surface 110*a* allows image light to enter the light incident surface 110*a*. The optical surface group includes a plurality of (e.g., two) optical surfaces that guides the image light via the light incident surface 110*a*.

The light incident surface 110*a* is, as an example, one end surface of the light guide plate main body 110. For example, a spherical surface, a non-spherical surface, a toroidal surface, an anamorphic non-spherical surface, or a free curved surface can be used as the curved surface for the light incident surface 110*a*. The light incident surface 110*a* may be a plane surface, not the curved surface.

The plurality of optical surfaces in the optical surface group includes a first optical surface 110*b* and a second optical surface 110*c*. The first optical surface 110*b* is a total internal reflection surface that totally internally reflects the image light via the light incident surface 110*a*. The second optical surface 110*c* faces the light incident surface 110*a* and bends each (image display light) of the plurality of light beams L1 to L5 contained in the image light toward the corresponding reflection surface RS, the image light being totally internally reflected on the first optical surface 110*b*.

The first optical surface 110*b* is, as an example, one side surface in a thickness direction TD of the light guide plate main body 110. It is desirable that the first optical surface 110*b* be as flat as possible. Each light beam (image display light) via the light incident surface 110*a* enters the first optical surface 110*b* at such an angle of incidence that it is totally internally reflected on the first optical surface 110*b* (angle of incidence equal to or larger than a critical angle).

The second optical surface 110*c* is, as an example, a portion next to the first optical surface 110*b* at another end surface of the light guide plate main body 110. As an example, a concave mirror is used for the second optical surface 110*c*. For example, a spherical surface, a non-spherical surface, a toroidal surface, an anamorphic non-spherical surface, or a free curved surface can be used as the curved surface for the concave mirror. In general, a metal coat is used for the concave mirror. It is because it is difficult to design a concave mirror satisfying the angle of total internal reflection. As a matter of course, a concave mirror using an interface with an air layer, for example, can be realized if it is possible to design a concave mirror satisfying the angle of total internal reflection.

The light guide plate main body 110 further includes, as an example, a light emission surface 110*d*. The light emission surface 110*d* faces the first optical surface 110*b* and emits light beams contained in image light via the reflection surfaces RS toward the eyeball EB. The light emission surface 110*d* is, as an example, another side surface in the thickness direction TD of the light guide plate main body 110.

The light guide plate main body 110 is, as an example, constituted by first and second members 111 and 112. The first and second members 111 and 112 are joined via an adhesive layer 115. Refractive indices of the first and second members 111 and 112 and the adhesive layer 115 are substantially the same (close to each other). The first and second members 111 and 112 are fabricated by injection molding using, for example, a resin for the material or by cutting and machining a glass.

The second member 112 includes a light incident surface 110*a* and first and second optical surfaces 110*b* and 110*c*. The first member 111 includes a light emission surface 110*d*.

The plurality of reflection surfaces RS (e.g., RS1 to RS5) is provided in a first joining portion J1 which is a portion of a joining portion of the first and second members 111 and 112. Each reflection surface RS is an interface between the first member 111 and an air layer (aperture AP to be described later). The adhesive layer 115 includes apertures AP (e.g., AP1 to AP5) which are the air layer opened to a side of at least the first member 111 of the first and second members 111 and 112. It should be noted that the reflection surface may be configured, for example, by filling each aperture AP with an adhesive and depositing a metal film or dielectric multi-layer film at a position corresponding to the aperture AP in the first joining portion J1.

In a second joining portion J2 of the first and second members 111 and 112, which is located between the light incident surface 110*a* and the first joining portion J1, the joining surfaces of the first and second members 111 and 112, which face the light incident surface 110*a*, face each other.

The adhesive layer 115 has light transmittance. Specifically, the adhesive layer 115 includes a transparent or semi-transparent adhesive. The adhesive layer 115 favorably has viscosity of 1000 to 10000 Pas and more favorably has viscosity of 2000 to 5000 Pa*s. The adhesive layer 115 includes, for example, an ultraviolet curable adhesive.

In the first joining portion J1 of the first and second members 111 and 112, the first member 111 includes a first fitting portion in its surface joined to the second member 112. In the first joining portion J1, the second member 112 includes a second fitting portion that substantially fits to the first fitting portion in its surface joined to the first member 111. At least the first fitting portion of the first and second fitting portions faces the apertures AP. The reflection surface RS is an interface between the first fitting portion and the aperture AP.

One of the first and second fitting portions includes a protrusion group including a plurality of (e.g., five) protrusions corresponding to the plurality of apertures AP (e.g., AP1 to AP5) as a plurality of constituent portions. The other of the first and second fitting portions has a recess group including a plurality of (e.g., five) recesses as a plurality of constituent portions. The plurality of (e.g., five) recesses corresponds to the plurality of apertures AP (e.g., AP1 to AP5). A plurality of protrusions is respectively inserted into (e.g., substantially fitted in) the plurality of (e.g., five) recesses.

Each constituent portion (protrusion or recess) in a group of the protrusion group and the recess group, which at least the first fitting portion has, faces the corresponding aperture AP of the plurality of apertures AP. The interface between each constituent portion in the group that the first fitting portion has and the corresponding aperture AP is the reflection surface RS.

As an example, each constituent portion in the group that the first fitting portion has a surface that faces the aperture AP that is the corresponding air layer. The surface is, as an example, a tilt surface tilting with respect to the thickness direction TD of the light guide plate main body 110. As an example, the tilt surfaces of the respective constituent portions (protrusions or recesses) in the group that the first fitting portion has are parallel to each other. As it will be described later, the reflection surface RS is, as an example, a plane surface and the flatness of the reflection surface RS depends on the flatness of the tilt surface. Therefore, it is favorable that the tilt surface has flatness sufficiently enhanced by surface grinding, for example.

(Reflection Surface)

Each reflection surface RS reflects a corresponding light beam contained in the image light via the optical surface group to a side of the eyeball EB. That is, each reflection surface RS functions as a combiner.

The plurality of reflection surfaces RS (e.g., RS1 to RS5) is, as an example, arranged between the light incident surface 110*a* and the second optical surface 110*c* in a direction in which the light incident surface 110*a* and the second optical surface 110*c* face each other (in a direction orthogonal to the thickness direction TD of the light guide plate main body 110) regularly (e.g., periodically, at equal intervals, or the like). It should be noted that the plurality of reflection surfaces RS is not limited to the direction orthogonal to the thickness direction of the light guide plate main body 110. In short, it is favorable that the plurality of reflection surfaces RS is arranged in a direction that intersects with the thickness direction TD of the light guide plate main body 110.

The plurality of reflection surfaces RS is, as an example, parallel to each other. The reflection surfaces RS1 to RS5 are provided corresponding to the light beams L1 to L5 contained in the image light, respectively.

As described above, the reflection surfaces RS are interfaces between the light guide plate main body 110 and the apertures AP. To be specific, the reflection surface RS1 is an interface between the light guide plate main body 110 and the aperture AP1. The reflection surface RS2 is an interface between the light guide plate main body 110 and the aperture AP2. The reflection surface RS3 is an interface between the light guide plate main body 110 and the aperture AP3. The reflection surface RS4 is an interface between the light guide plate main body 110 and the aperture AP4. The reflection surface RS5 is an interface between the light guide plate main body 110 and the aperture AP5.

The reflection surfaces RS are, as an example, plane surfaces. It is favorable that the reflection surfaces RS are as flat as possible.

Each reflection surface RS reflects (totally internally reflects) the corresponding light beam of the image light (image light via the optical surface group) via the second optical surface 110*c* to the side of the eyeball EB. That is, each light beam via the second optical surface 110*c* enters the reflection surface RS at such an angle of incidence that it is totally internally reflected on the corresponding reflection surface RS. The light beam via the reflection surface RS enters the pupil of the eyeball EB via the light emission surface 110*d*.

(Light-Shielding Portion)

The light-shielding portion SP shields stray light components SLC of the image light generated by the image light generation apparatus 100. Here, the stray light components SLC are unwanted light of the image light, the unwanted light excluding image display light (light used for image display).

To be specific, the light-shielding portion SP shields the stray light components SLC of the plurality of light beams (e.g., the light beams L1 to L5) contained in the image light. More specifically, the stray light component $SLC_{L1}$ of the light beam L1 is light emitted from the same pixel as the pixel from which the light beam L1 is emitted. The stray light component $SLC_{L2}$ of the light beam L2 is light emitted from the same pixel as the pixel from which the light beam L2 is emitted. The stray light component $SLC_{L3}$ of the light beam L3 is light emitted from the same pixel as the pixel from which the light beam L3 is emitted. The stray light component $SLC_{L4}$ of the light beam L4 is light emitted from the same pixel as the pixel from which the light beam L4 is emitted. The stray light component $SLC_{L5}$ of the light beam L5 is light emitted from the same pixel as the pixel from which the light beam L5 is emitted.

Each stray light component is particular light of the image light, the particular light excluding light that is guided to the reflection surface RS via the light incident surface 110*a* and the optical surface group. To be specific, each stray light component is particular light of the image light, the particular light excluding light that enters the first optical surface 110*b* within a predetermined angle-of-incidence range satisfying the total internal reflection condition via the light incident surface 110*a*.

The light-shielding portion SP is, as an example, provided inside the light guide plate main body 110. Specifically, the light-shielding portion SP is located between a virtual surface VS including the reflection surface RS and the light incident surface 110*a*. To be specific, the light-shielding portion SP is located between the virtual surface VS and the light incident surface 110*a*, the virtual surface VS including the reflection surface RS1 closest to the light incident surface 110*a* among the plurality of reflection surfaces RS.

In addition, the light-shielding portion SP is located at a position deviated from the optical path of the image light between the light incident surface 110*a* and the optical surface group. To be specific, the light-shielding portion SP is located at a position deviated from the optical path of the image light (image display light) between the light incident surface 110*a* and the first optical surface 110*b*. Accordingly, the plurality of light beams (e.g., the light beams L1 to L5) that is the image display light is prevented from being shielded by the light-shielding portion SP.

It is favorable that at least a portion of the light-shielding portion SP is located between the light incident surface 110*a* and the reflection surface RS. Accordingly, stray light components of the image light, which travel directly to the reflection surfaces RS via the light incident surface 110*a*, can be shielded.

The light-shielding portion SP is provided at a position closer to the light emission surface 110*d* than the first optical surface 110*b*. Accordingly, the degree of freedom in design of the optical surface group that guides the image display light of the image light is enhanced.

The light-shielding portion SP is provided in the second joining portion J2 located between the light incident surface 110*a* and the first joining portion J1, which is another portion of the joining portion of the first and second members 111 and 112. To be specific, in the second joining portion J2, the light-shielding portion SP is arranged between the joining surfaces of the first and second members 111 and 112, which face the light incident surface 110*a*. Accordingly, the light-shielding portion SP can be easily incorporated in the light guide plate main body 110 when joining the first and second members 111 and 112.

The light-shielding portion SP may include, for example, paint. Specifically, in the second joining portion J2, the paint as the light-shielding portion SP may be paint applied to the joining surface of the first member 111 with the second member 112 and/or the joining surface of the second member 112 with the first member 111.

The light-shielding portion SP may include, for example, a metal thin film. In the second joining portion J2, the metal thin film as the light-shielding portion SP is deposited on the joining surface of the first member 111 with the second member 112 and/or the joining surface of the second member 112 with the first member 111 by vapor deposition or sputtering, for example.

The light-shielding portion SP may include, for example, a light-shielding film. In the second joining portion J2, the light-shielding film as the light-shielding portion SP can be attached to the joining surface of the first member 111 with the second member 112 and/or the joining surface of the second member 112 with the first member 111.

It is favorable that the light-shielding portion SP absorbs at least a portion of the stray light components entering it. Specifically, it is favorable that the light-shielding portion SP has a color as dark as possible (e.g., black) for the sake of preventing generation of reflected light of the stray light components (secondary and lower-order stray light components of the stray light components). It is favorable that the light-shielding portion SP has a color as light as possible for the sake of making it unremarkable to a user who is an observer and other people.

<<Display Operation of Display Apparatus>>

The light beam L1 emitted from the image light generation apparatus 100 enters the light guide plate main body 110 via the light incident surface 110*a*, is totally internally reflected on the first optical surface 110*b*, is collected at the second optical surface 110*c*, and enters the reflection surface RS1. The light beam L1 reflected on the reflection surface RS1 is refracted on the light emission surface 110*d* and enters the eyeball EB so as to form a maximum angle of view on one side.

The light beam L3 emitted from the image light generation apparatus 100 enters the light guide plate main body 110 via the light incident surface 110*a*, is totally internally reflected on the first optical surface 110*b*, is collected at the second optical surface 110*b*, and enters the reflection surface RS3. The light beam L3 reflected on the reflection surface RS3 passes straight through the light emission surface 110$d$ and enters the eyeball EB so as to form a center angle of view.

The light beam L2 emitted from the image light generation apparatus 100 enters the light guide plate main body 110 via the light incident surface 110$a$, is totally internally reflected on the first optical surface 110$b$, is collected at the second optical surface 110$c$, and enters the reflection surface RS2. The light beam L2 reflected on the reflection surface RS2 is refracted on the light emission surface 110$d$ and enters the eyeball EB so as to form an intermediate angle of view between the maximum angle of view on the one side and the center angle of view.

The light beam L5 emitted from the image light generation apparatus 100 enters the light guide plate main body 110 via the light incident surface 110$a$, is totally internally reflected on the first optical surface 110$b$, and enters the reflection surface RS5. The light beam L5 reflected on the reflection surface RS5 is refracted on the light emission surface 110$d$ and enters the eyeball EB so as to form a maximum angle of view on the other side.

The light beam L4 emitted from the image light generation apparatus 100 enters the light guide plate main body 110 via the light incident surface 110$a$, is totally internally reflected on the first optical surface 110$b$, is collected at the second optical surface 110$c$, and enters the reflection surface RS4. The light beam L4 reflected on the reflection surface RS4 is refracted on the light emission surface 110$d$ and enters the eyeball EB so as to form an intermediate angle of view between the maximum angle of view on the other side and the center angle of view.

<<Effects of Display Apparatus>>

The display apparatus 10-1 according to Example 1 includes the light guide plate LGP1 that guides to the eyeball EB the image light from the image light generation apparatus 100. The light guide plate LGP1 includes the light guide plate main body 110 including the light incident surface 110$a$ that allows the image light to enter the light incident surface 110$a$ and the optical surface group including the plurality of optical surfaces (e.g., the first and second optical surfaces 110$b$ and 110$c$) for guiding the image light via the light incident surface 110$a$, the at least one reflection surface RS (e.g., RS1 to RS5) that is provided inside the light guide plate main body 110 and reflects the image light via the optical surface group to the side of the eyeball EB, and the light-shielding portion SP that is provided in the light guide plate main body 110 and shields the stray light components SLC (e.g., $SLC_{L1}$ to $SLC_{L5}$) of the image light.

In this case, the light-shielding portion SP is capable of shielding the stray light components SLC of the image light.

As a result, in accordance with the display apparatus 10-1, a display apparatus capable of preventing unwanted images from being visually recognized by the observer and other people can be provided.

The light-shielding portion SP is provided inside the light guide plate main body 110. Accordingly, the degree of freedom in arrangement for the light-shielding portion SP can be enhanced under the condition where the image display light of the image light is not shielded.

The light-shielding portion SP is provided at a position on the virtual surface VS on the side of the light incident surface 110$a$, the virtual surface VS including the reflection surface RS. Accordingly, the stray light components of the image light can be shielded at a position relatively close to the light incident surface 110$a$, and generation of stray light components derived of those stray light components (secondary and lower-order components of those stray light components) can be prevented.

The stray light components SLC are light of the image light, the light excluding light that is guided to the reflection surface RS via the light incident surface 110$a$ and the optical surface group. Accordingly, the light of the image light excluding the image display light can be reliably shielded as stray light components.

The light-shielding portion SP is located at a position deviated from the optical path of the image light between the light incident surface 110$a$ and the optical surface group. Accordingly, the image display light, which is light that enters the optical surface group via the light incident surface 110$a$, can be prevented from being shielded.

At least a portion of the light-shielding portion SP may be located between the light incident surface 110$a$ and the reflection surface RS. Accordingly, stray light components of the image light, which travel directly to the reflection surfaces RS via the light incident surface 110$a$, can be shielded.

The plurality of optical surfaces includes the first optical surface 110$b$ that totally internally reflects the image light via the light incident surface 110$a$ and the second optical surface 110$c$ that faces the light incident surface 110$a$ and bends the image light totally internally reflected on the first optical surface 110$b$ toward the reflection surface RS. Accordingly, downsizing of the display apparatus can be achieved.

The stray light components SLC are light of the image light, the light excluding light that enters the first optical surface 110$b$ via the light incident surface 110$a$ within a predetermined angle-of-incidence range satisfying the total internal reflection condition. Accordingly, the light excluding the image display light can be reliably shielded as stray light components.

The light-shielding portion SP is located at a position deviated from the optical path of the image light between the light incident surface 110$a$ and the first optical surface 110$b$. Accordingly, the image display light can be prevented from being shielded.

The at least one reflection surface RS is the plurality of reflection surfaces RS arranged between the light incident surface 110$a$ and the second optical surface 110$c$ in the direction in which the light incident surface 110$a$ and the second optical surface 110$c$ face each other. The light-shielding portion SP is provided at the position on the virtual surface VS on the side of the light incident surface 110$a$, the virtual surface VS including the reflection surface RS1 closest to the light incident surface 110$a$ among the plurality of reflection surfaces RS. Accordingly, the stray light components SLC of the image light can be shielded at a position closer to the light incident surface 110$a$, and generation of stray light components derived of those stray light components (secondary and lower-order components of those stray light components) can be further prevented.

The light guide plate main body 110 further includes the light emission surface 110$d$ that faces the first optical surface 110$b$ and emits image light via the reflection surfaces RS toward the eyeball EB. The light-shielding portion SP is provided at a position closer to the light emission surface 110$d$ than the first optical surface 110$b$. Accordingly, the degree of freedom in design for the optical surface group in the light guide plate main body 110 can be enhanced.

The light guide plate main body 110 is constituted by a plurality of (e.g., two) joined members including the first and second members 111 and 112. The reflection surfaces RS and the light-shielding portion SP are provided in the joining portion of the first and second members 111 and 111. Accordingly, the reflection surfaces RS and the light-shielding portion SP can be provided when joining the first and second members 111 and 112.

The light guide plate main body 110 is constituted by a plurality of (e.g., two) joined members including the first and second members 111 and 112. The reflection surface RS is provided in the first joining portion J1 of the first and second members 111 and 112. At least a portion (e.g., entire portion) of the light-shielding portion SP is provided in the second joining portion J2 of the first and second members 111 and 112. The second joining portion J2 is located between the light incident surface 110*a* and the first joining portion J1. Accordingly, the light-shielding portion SP can be easily provided at an effective position inside the light guide plate main body 110.

The second member 112 includes the light incident surface 110*a* and the first and second optical members 111 and 112. The first member 111 includes the reflection surfaces RS. In the second joining portion J2, the joining surfaces of the first and second members 111 and 112, which face the light incident surface 110*a*, are joined via the light-shielding portion SP. Accordingly, the stray light components SLC can be efficiently shielded and the light-shielding portion SP can be made as unremarkable as possible to the observer and other people. In addition, the stray light components can be effectively shielded by the light-shielding portion SP with a smaller shielding area.

The second optical surface 110*c* is a concave mirror. Accordingly, the image display light entering the second optical surface 110*c* can be collected to the reflection surfaces RS. It should be noted that for example, a spherical surface, a non-spherical surface, an anamorphic non-spherical surface, or a free curved surface can be employed as the surface shape of the concave mirror.

The reflection surfaces RS are capable of reflecting the image display light to the side of the eyeball EB with no influence of aberration because they are the plane surfaces.

It is favorable that the light-shielding portion SP absorbs at least a portion of the stray light components entering it. Accordingly, generation of stray light components derived of those stray light components (secondary and lower-order reflection components of those stray light components) can be suppressed.

The light-shielding portion SP may include paint. Accordingly, the light-shielding portion SP can be formed to be thin.

The light-shielding portion SP may include a metal thin film. Accordingly, the light-shielding portion SP can be formed to be thin.

The light-shielding portion SP may include a light-shielding film. Accordingly, the light-shielding portion SP can be easily provided.

Figure 2:
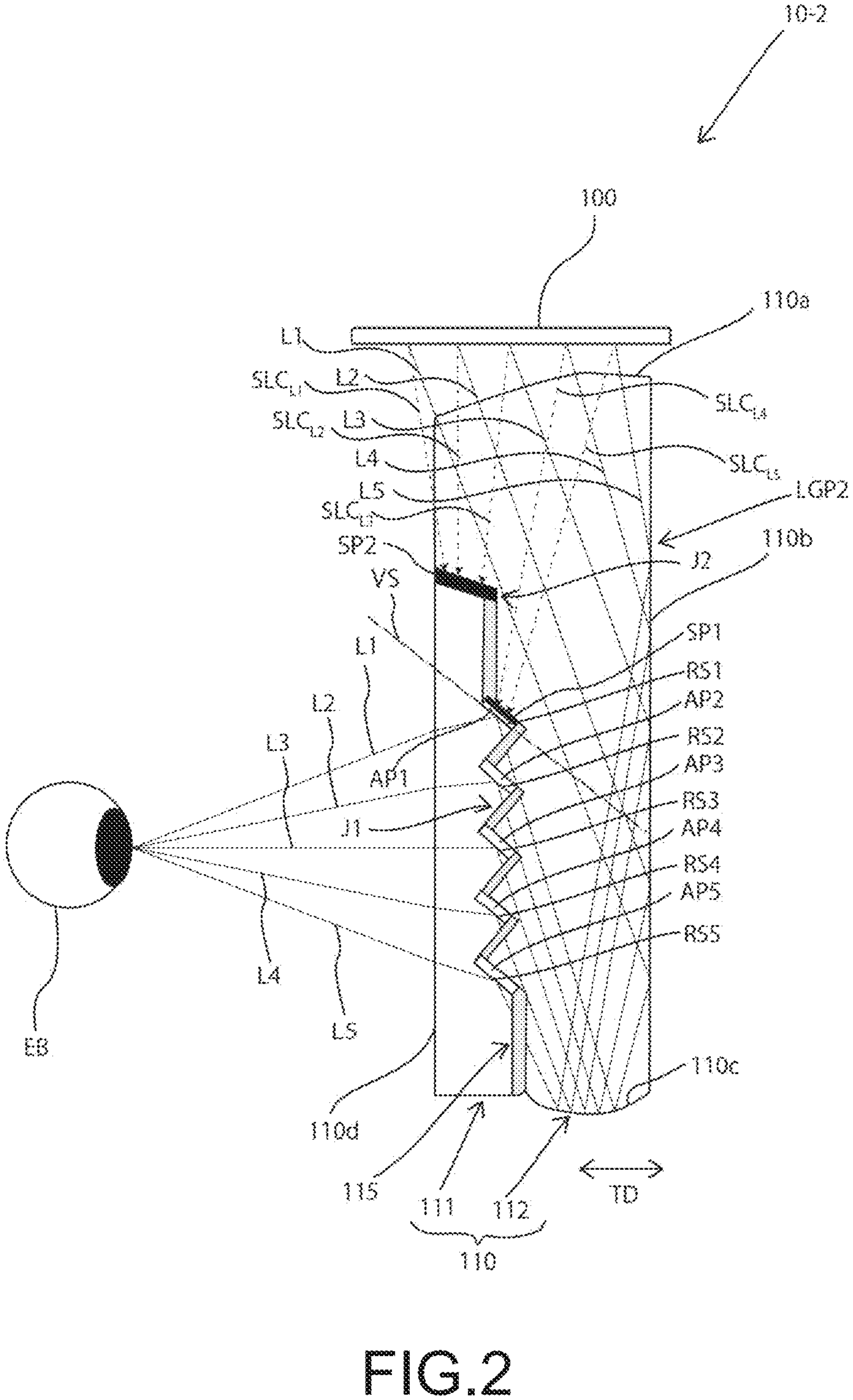
FIG. 2 A cross-sectional view schematically showing a configuration of a display apparatus according to Example 2 of the first embodiment of the present technology.

3. Display Apparatus According to Example 2 of First Embodiment of Present Technology Hereinafter, a display apparatus 10-2 according to Example 2 of the first embodiment of the present technology will be described with reference to FIG. 2. As shown in FIG. 2, the display apparatus 10-2 has a configuration similar to the display apparatus 10-2 according to Example 1 except for the fact that light-shielding portions are provided in the second joining portion J2 of the first and second members 111 and 112 and also in the first joining portion J1.

In a light guide plate LGP2 in the display apparatus 10-2, a first light-shielding portion SP1 is provided in the first joining portion J1 and a second light-shielding portion SP2 is provided in the second joining portion J2.

The first light-shielding portion SP1 has substantially the same characteristics as the light-shielding portion SP in the display apparatus 10-1. The first light-shielding portion SP1 is provided on the back side of the reflection surface RS1. To be specific, in the first joining portion J1, the first light-shielding portion SP1 is provided in a tilt surface of a constituent portion (protrusion or recess) of the second fitting portion of the second member 112, which corresponds to the reflection surface RS1. An aperture AP1 that is a gas phase is formed between the first light-shielding portion SP1 and the constituent portion corresponding to the first fitting portion of the first member 111. The first light-shielding portion SP1 shields, for example, the stray light component $SLC_{L4}$ of the light beam L4 and the stray light component $SLC_{L5}$ of the light beam L5.

The second light-shielding portion SP2 has substantially the same characteristics and arrangement as the light-shielding portion SP in the display apparatus 10-1. The second light-shielding portion SP2 shields, for example, the stray light component $SLC_{L1}$ of the light beam L1, the stray light component $SLC_{L2}$ of the light beam L2, and the stray light component $SLC_{L3}$ of the light beam L3.

In accordance with the display apparatus 10-2, effects similar to those of the display apparatus 10-1 according to Example 1 are provided and the light-shielding portions are provided in the first joining portion J1 and also in the second joining portion J2. Therefore, further unwanted stray light components of the image light (e.g., stray light components that travel directly to the back surface of the reflection surface RS via the light incident surface 110*a*) can be shielded. Thus, unwanted images can be further prevented from being visually recognized by the observer and other people.

Figure 3:
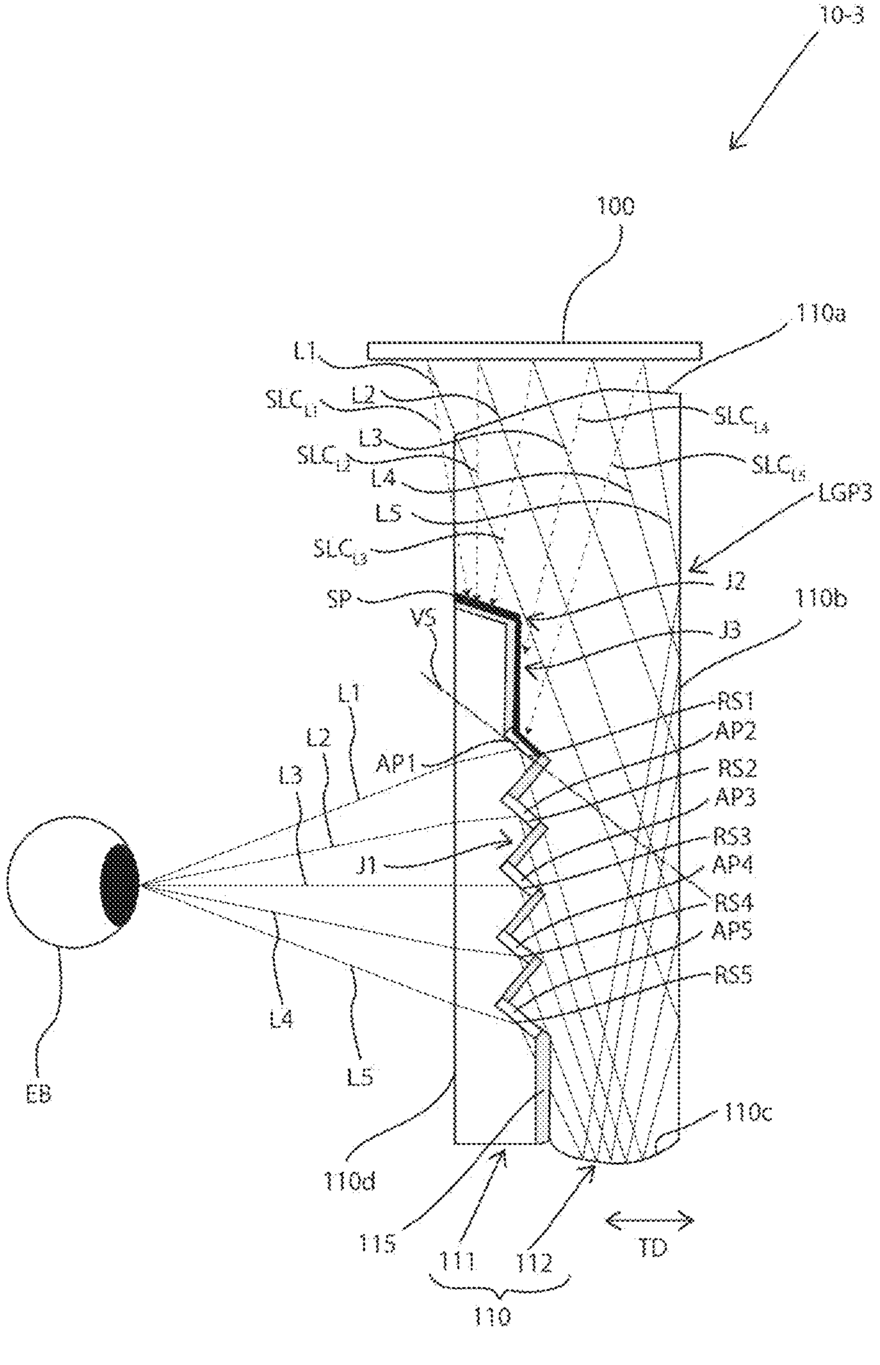
FIG. 3 A cross-sectional view schematically showing a configuration of a display apparatus according to Example 3 of the first embodiment of the present technology.

4. Display Apparatus According to Example 3 of First Embodiment of Present Technology Hereinafter, a display apparatus 10-3 according to Example 3 of the first embodiment of the present technology will be described with reference to FIG. 3. As shown in FIG. 3, the display apparatus 10-3 has a configuration similar to the display apparatus 10-2 according to Example 2 except for the fact that a light-shielding portion SP is provided over a first joining portion J1 and a second joining portion J2.

In a light guide plate LGP3 in the display apparatus 10-3, a light-shielding portion SP is provided extending from the second joining portion J2 to a portion of the first joining portion J1.

To be specific, regarding the light-shielding portion SP in the light guide plate LGP3, one end portion is provided in the second joining portion J2, the other end portion is provided on the back side of the reflection surface RS1 in the first joining portion J1 (substantially the same as the first light-shielding portion SP1 in the light guide plate LGP2 according to Example 2), and an intermediate portion is provided in a third joining portion J3 of the first and second members 111 and 112, which is located between the first and second joining portions J1 and J2. More specifically, the light-shielding portion SP is provided extending from the second joining portion J2 to a portion of the first joining portion J1 in the joining surface of the second member 112 with the first member 111 to have substantially the same thickness as the first light-shielding portion SP1 in the light guide plate LGP2 according to Example 2. In the light guide plate LGP3, an adhesive layer 115 is located between the one end portion and intermediate portion of the light-shielding portion SP and the first member 111.

For example, the light-shielding portion SP in the light guide plate LGP3 shields the stray light component $SLC_{L1}$ of the light beam L1, the stray light component $SLC_{L2}$ of the light beam L2, and the stray light component $SLC_{L3}$ of the light beam L3 at the one end portion, shields the stray light component $SLC_{L4}$ of the light beam L4 at the intermediate portion, and shields the stray light component $SLC_{L5}$ of the light beam L5 at the other end portion.

In accordance with the display apparatus 10-3, the same effects as the display apparatus 10-2 according to Example 2 are provided and the light-shielding portion is also provided in the third joining portion J3. Therefore, further unwanted stray light components of the image light can be shielded. Thus, unwanted images can be further prevented from being visually recognized by the observer and other people.

Figure 4:
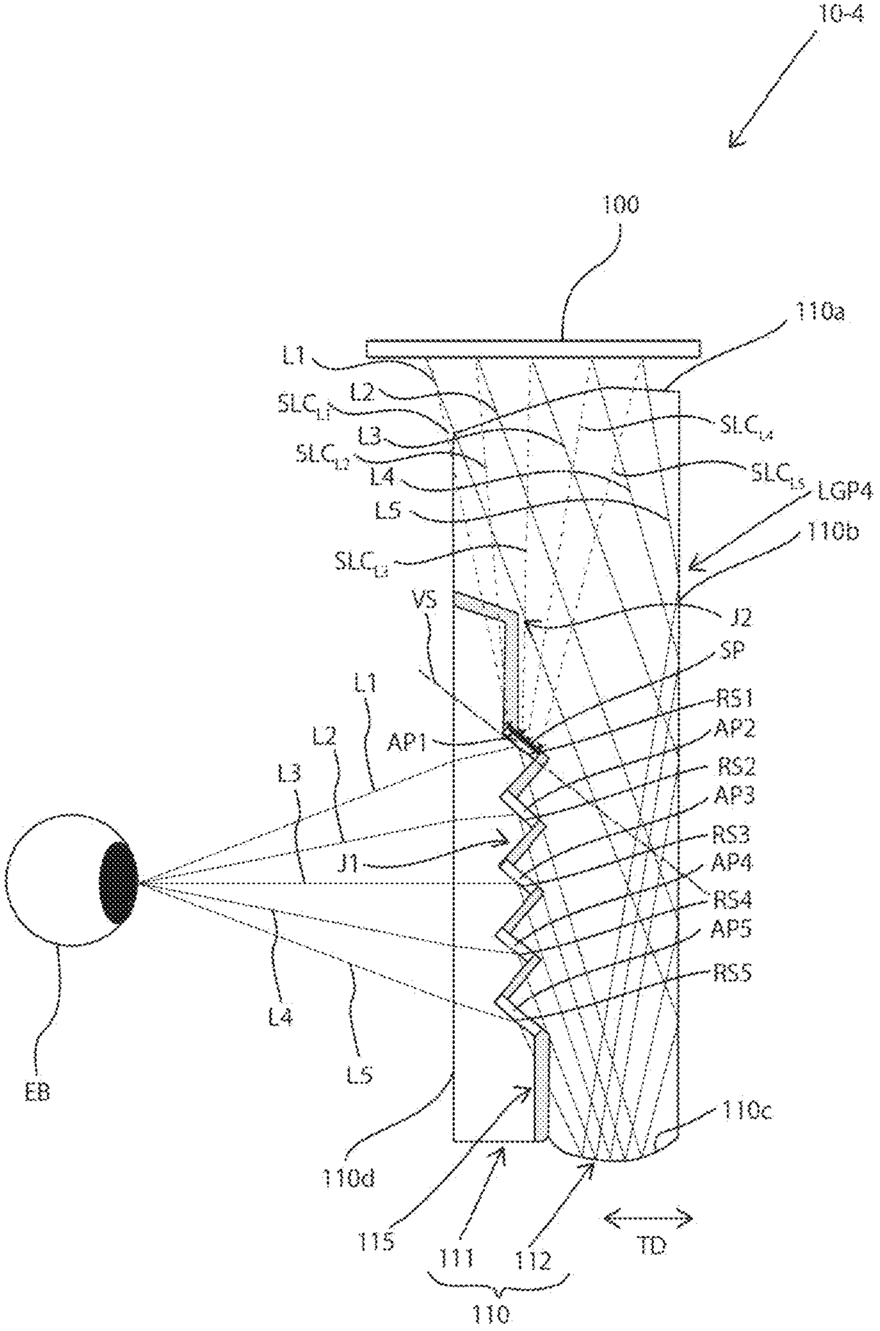
FIG. 4 A cross-sectional view schematically showing a configuration of a display apparatus according to Example 4 of the first embodiment of the present technology.

5. Display Apparatus According to Example 4 of First Embodiment of Present Technology Hereinafter, a display apparatus 10-4 according to Example 4 of the first embodiment of the present technology will be described with reference to FIG. 4. As shown in FIG. 4, the display apparatus 10-4 has configurations similar to those of the display apparatus 10-1 according to Example 1 except for the fact that a light-shielding portion SP is provided only on the back side of the reflection surface RS1 in a light guide plate LGP4.

The light-shielding portion SP in the light guide plate LGP4 shields, for example, the stray light component $SLC_{L1}$ of the light beam L1, the stray light component $SLC_{L2}$ of the light beam L2, the stray light component $SLC_{L3}$ of the light beam L3, the stray light component $SLC_{L4}$ of the light beam L4, and the stray light component $SLC_{L5}$ of the light beam L5.

In accordance with the display apparatus 10-4, the stray light components can be effectively shielded by the light-shielding portion SP with a smaller shielding area. That is, the light-shielding portion SP is unnoticeable and the stray light components can be efficiently shielded.

Figure 5:
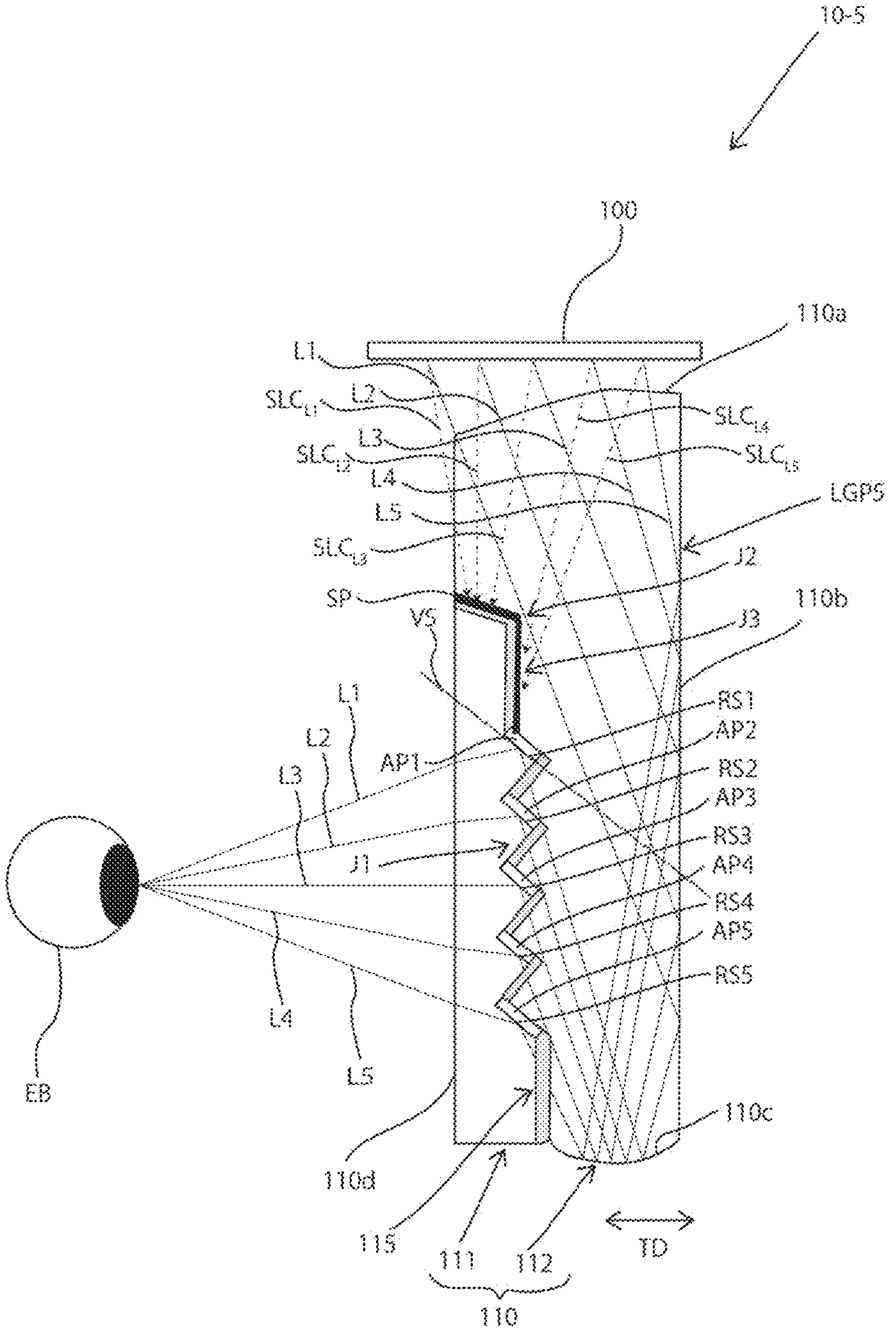
FIG. 5 A cross-sectional view schematically showing a configuration of a display apparatus according to Example 5 of the first embodiment of the present technology.

6. Display Apparatus According to Example 5 of First Embodiment of Present Technology Hereinafter, a display apparatus 10-5 according to Example 5 of the first embodiment of the present technology will be described with reference to FIG. 5. As shown in FIG. 5, the display apparatus 10-5 has a configuration similar to the display apparatus 10-3 according to Example 3 except for the fact that the light-shielding portion SP is provided only in second and third joining portions J2 and J3 in a light guide plate LGP5.

To be specific, a portion of the light-shielding portion SP in the light guide plate LGP5 is provided in the second joining portion J2 and another portion is provided in the third joining portion J3. More specifically, the light-shielding portion SP is provided extending from the second joining portion J2 to the third joining portion J3 in the joining surface of the second member 112 with the first member 111 to have substantially the same thickness as the first light-shielding portion SP1 in the light guide plate LGP2 according to Example 2. In the light guide plate LGP5, an adhesive layer 115 is located between the light-shielding portion SP and the first member 111.

For example, the light-shielding portion SP in the light guide plate LGP5 shields, at the portion, the stray light component $SLC_{L1}$ of the light beam L1, the stray light component $SLC_{L2}$ of the light beam L2, and the stray light component $SLC_{L3}$ of the light beam L3 and shields, at the other portion, the stray light component $SLC_{L4}$ of the light beam L4 and the stray light component $SLC_{L5}$ of the light beam L5.

In accordance with the display apparatus 10-5, effects similar to those of the display apparatus 10-1 according to Example 1 are provided and the light-shielding portion is also provided in the third joining portion J3. Therefore, further unwanted stray light components of the image light can be shielded.

Figure 6:
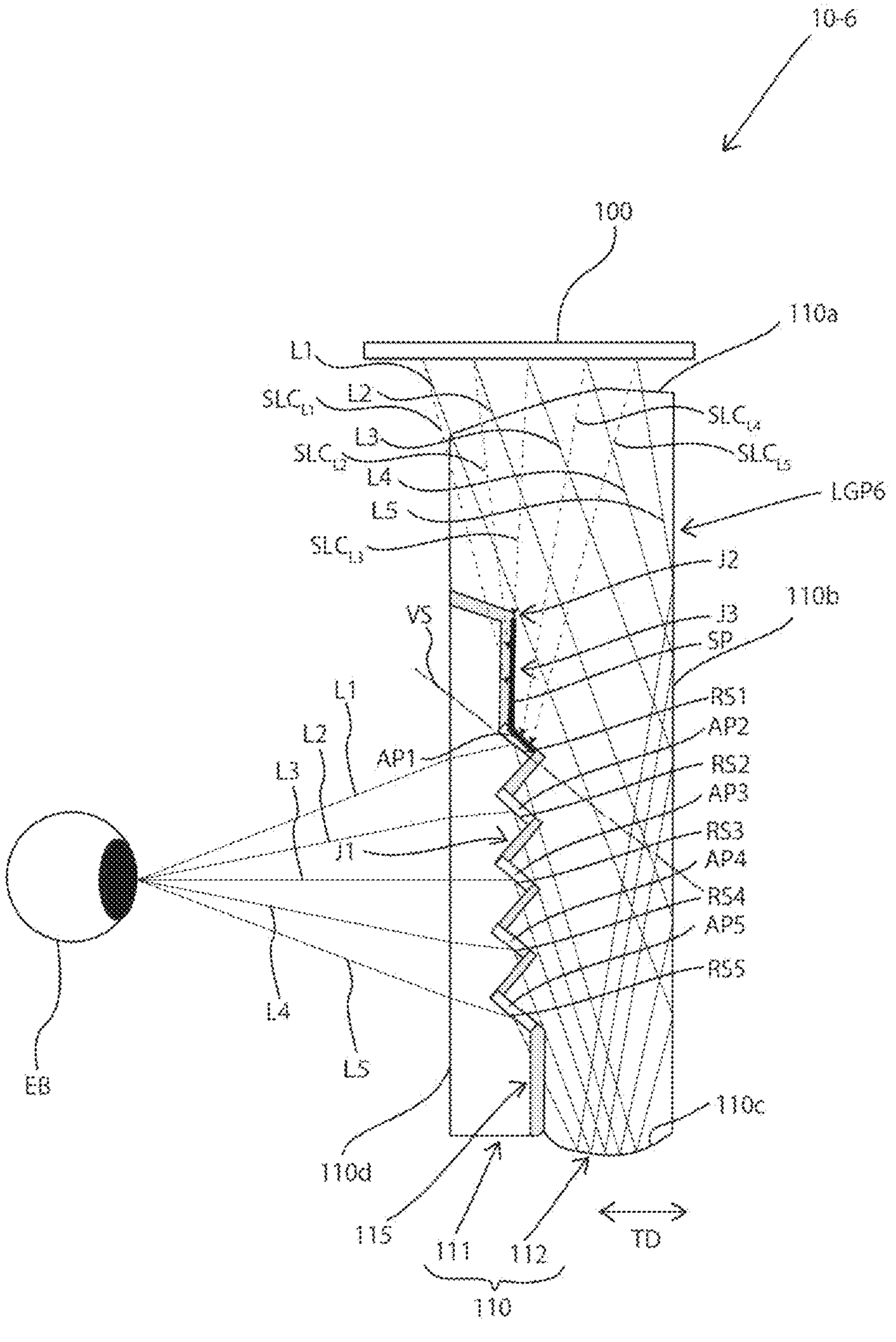
FIG. 6 A cross-sectional view schematically showing a configuration of a display apparatus according to Example 6 of the first embodiment of the present technology.

7. Display Apparatus According to Example 6 of First Embodiment of Present Technology Hereinafter, a display apparatus 10-6 according to Example 6 of the first embodiment of the present technology will be described with reference to FIG. 6. As shown in FIG. 6, the display apparatus 10-6 has a configuration similar to the display apparatus 10-3 according to Example 3 except for the fact that a light-shielding portion SP is provided only in first and third joining portions J1 and J3 in a light guide plate LGP 6.

To be specific, a portion of the light-shielding portion SP in the light guide plate LGP6 is provided in the first joining portion J1 and another portion is provided in the third joining portion J3. More specifically, the light-shielding portion SP is provided extending from the third joining portion J3 to a portion of the first joining portion J1 in the joining surface of the second member 112 with the first member 111 to have substantially the same thickness as the first light-shielding portion SP1 in the light guide plate LGP2 according to Example 2. In the light guide plate LGP6, an adhesive layer 115 is located between the other portion of the light-shielding portion SP and the first member 111.

For example, the light-shielding portion SP in the light guide plate LGP6 shields, at the portion, the stray light component $SLC_{L4}$ of the light beam L4 and the stray light component $SLC_{L5}$ of the light beam L5 and shields, at the other portion, the stray light component $SLC_{L1}$ of the light beam L1, the stray light component $SLC_{L2}$ of the light beam L2, and the stray light component $SLC_{L3}$ of the light beam L3.

In accordance with the display apparatus 10-6, the light-shielding portion is provided only in the first and third joining portions J1 and J3. Therefore, unwanted stray light components can be shielded with a relatively small shielding area.

Figure 7:
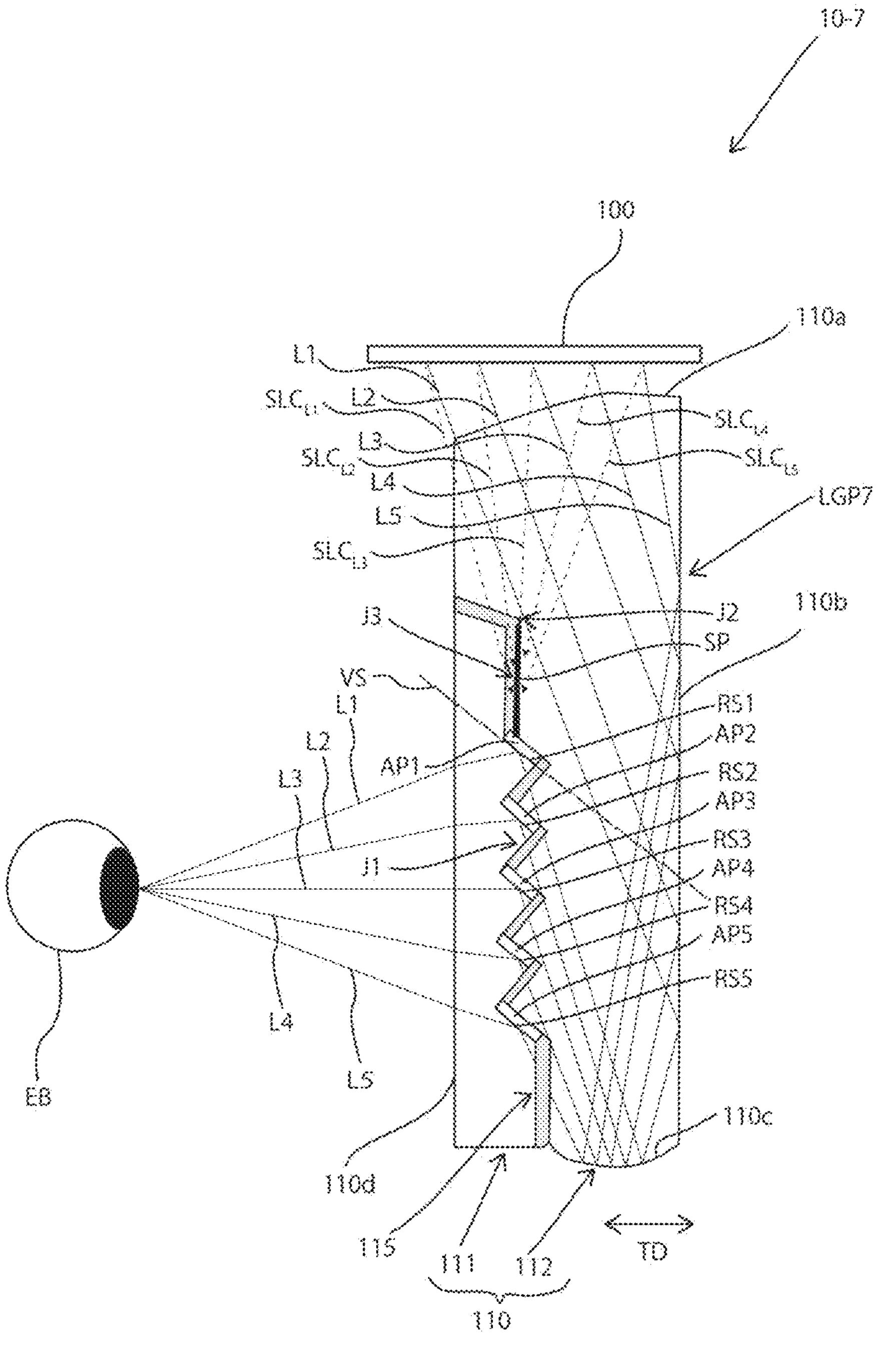
FIG. 7 A cross-sectional view schematically showing a configuration of a display apparatus according to Example 7 of the first embodiment of the present technology.

8. Display Apparatus According to Example 7 of First Embodiment of Present Technology Hereinafter, a display apparatus 10-7 according to Example 7 of the first embodiment of the present technology will be described with reference to FIG. 7. As shown in FIG. 7, the display apparatus 10-7 has a configuration similar to the display apparatus 10-3 according to Example 3 except for the fact that a light-shielding portion SP is provided only in a third joining portion J3 in a light guide plate LGP7.

To be specific, in the third joining portion J3, the light-shielding portion SP is provided in the joining surface of the second member 112 with the first member 111 to have substantially the same thickness as the first light-shielding portion SP1 in the light guide plate LGP2 according to Example 2. In the light guide plate LGP7, an adhesive layer 115 is located between the light-shielding portion SP and the first member 111.

The light-shielding portion SP in the light guide plate LGP7 shields, for example, the stray light component $SLC_{L1}$ of the light beam L1, the stray light component $SLC_{L2}$ of the light beam L2, the stray light component $SLC_{L3}$ of the light beam L3, the stray light component $SLC_{L4}$ of the light beam L4, and the stray light component $SLC_{L5}$ of the light beam L5.

In accordance with the display apparatus 10-7, the light-shielding portion SP is provided only in the third joining portion J3. Therefore, unwanted stray light components can be shielded with a much smaller shielding area.

Figure 8:
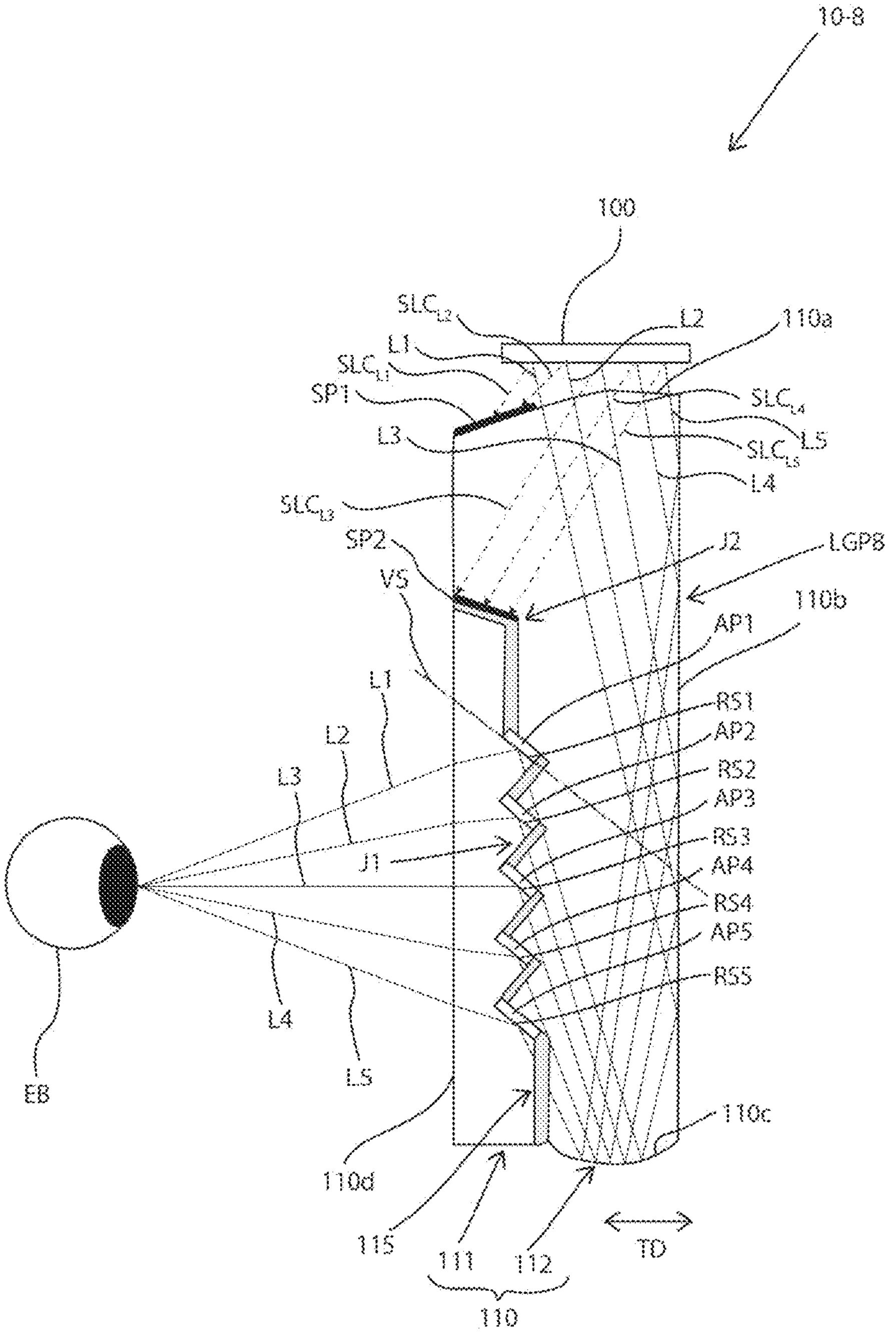
FIG. 8 A cross-sectional view schematically showing a configuration of a display apparatus according to Example 8 of the first embodiment of the present technology.

9. Display Apparatus According to Example 8 of First Embodiment of Present Technology Hereinafter, a display apparatus 10-8 according to Example 8 of the first embodiment of the present technology will be described with reference to FIG. 8. As shown in FIG. 8, the display apparatus 10-8 has configurations similar to those of the display apparatus 10-1 according to Example 1 except for the fact that a light-shielding portions is also provided in a light incident surface 110*a* in a light guide plate LGP8.

In the light guide plate LGP8 in the display apparatus 10-8, a first light-shielding portion SP1 is provided at a position on the light incident surface 110*a*, which is deviated from the optical path of the image light (image display light), between the image light generation apparatus 100 and the light incident surface 110*a* and a second light-shielding portion SP2 is provided in the second joining portion J2.

The first light-shielding portion SP1 in the light guide plate LGP8 has characteristics similar to those of the light-shielding portion SP in the light guide plate LGP1 in the display apparatus 10-1 according to Example 1.

The second light-shielding portion SP2 in the light guide plate LGP8 has characteristics and arrangement similar to those of the light-shielding portion SP in the light guide plate LGP1 in the display apparatus 10-1 according to Example 1.

In the light guide plate LGP8, for example, the first light-shielding portion SP1 shields the stray light component $SLC_{L1}$ of the light beam L1 and the stray light component $SLC_{L2}$ of the light beam L2 and the second light-shielding portion SP2 shields the stray light component $SLC_{L3}$ of the light beam L3, the stray light component $SLC_{L4}$ of the light beam L4, and the stray light component $SLC_{L5}$ of the light beam L5.

In accordance with the display apparatus 10-8, effects similar to those of the display apparatus 10-1 according to Example 1 are provided and further unwanted stray light components of the image light (e.g., stray light components $SLC_{L1}$ and $SLC_{L2}$ in FIG. 8) can be shielded.

It should be noted that in the display apparatus 10-8, for example, only the first light-shielding portion SP1 may be provided (the second light-shielding portion SP2 does not need to be provided).

10. Display Apparatus According to Second Embodiment of Present Technology

Figure 9:
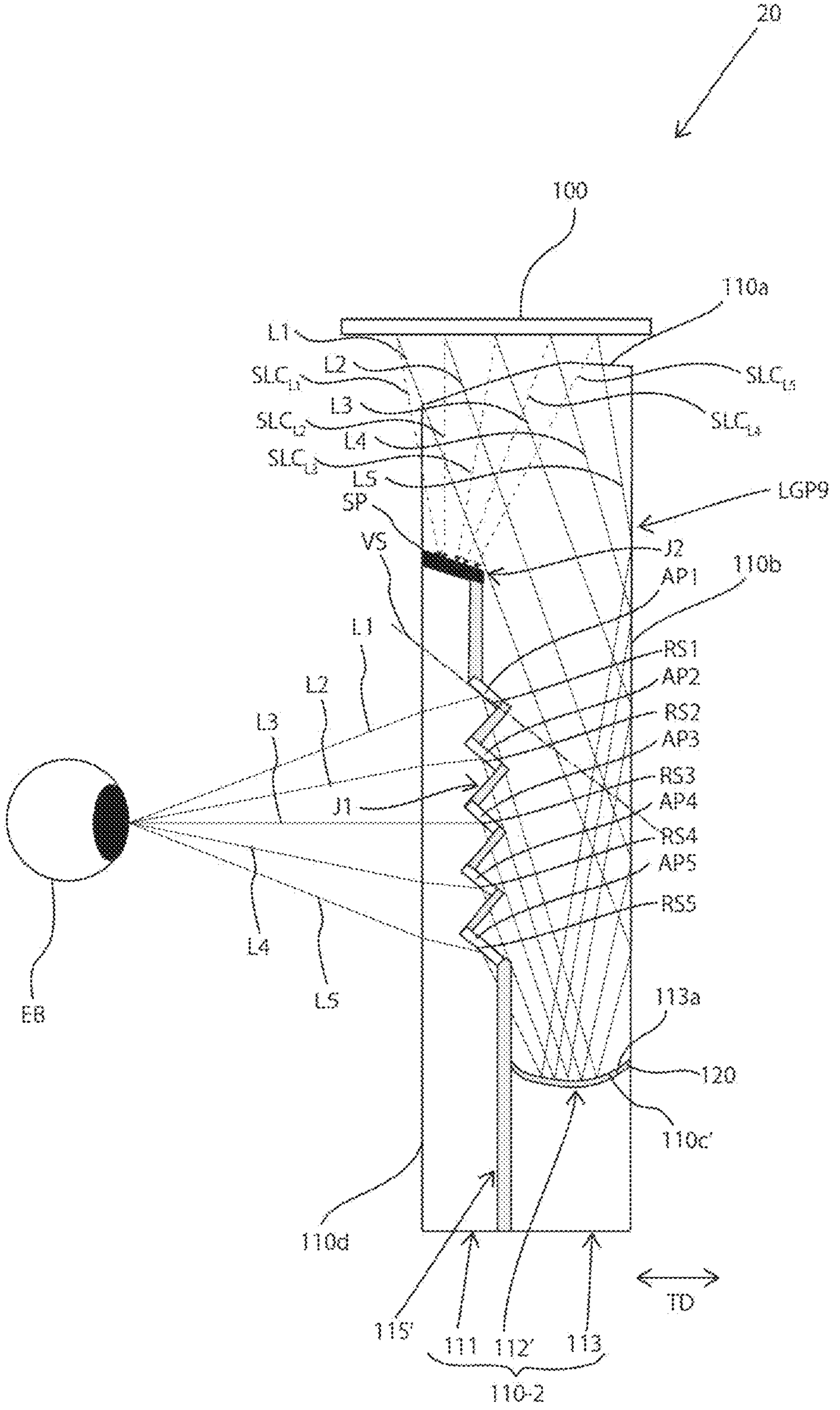
FIG. 9 A cross-sectional view schematically showing a configuration of a display apparatus according to a second embodiment of the present technology.

Hereinafter, a display apparatus 20 according to a second embodiment will be described with reference to FIG. 9.

By the way, in the display apparatus according to each Example of the first embodiment, the light incident surface 110*a* and the first and second optical surfaces 110*b* and 110*c* are formed in the second member 112. However, for fabricating such three optical surfaces by injection molding, it is difficult to secure shape precision for the optical surfaces and it takes cost.

In view of this, in the display apparatus 20 according to the second embodiment, a light guide plate main body 110-2 for a light guide plate LGP9 is constituted by first to third members 111, 112', and 113 and a second optical surface 113*a* (e.g., a concave mirror) is formed in the third member 113.

The second optical surface 113*a* of the third member 113 is joined with an end surface 110*c*' that faces the light incident surface 110*a* of the second member 112'. The end surface 110*c*' has a shape conforming to a concave surface of the second optical surface 113*a* and is joined to the second optical surface 113*a* via an adhesive layer 120 having substantially the same refractive index as the second member 112'. Therefore, light is hardly refracted between the second member 112' and the adhesive layer 120. That is, refraction of light beams when the light beams enter the second optical surface 113*a* and when the light beams are reflected from the second optical surface 113*a* is suppressed. Thus, degradation of optical characteristics is suppressed.

In accordance with the display apparatus 20, effects similar to those of the display apparatus 10-1 according to Example 1 of the first embodiment are provided and optical functions of the light guide plate main body 110-2 are shared by three members (first to third members 111, 112', and 113). Therefore, the precision for each member can be enhanced and the resolving power can be enhanced.

In addition, in accordance with the display apparatus 20, the optical surfaces of the second member can be reduced to two surfaces (light incident surface 110*a* and first optical surface 110*b*). Therefore, a die for molding the second member can be simplified, and the cost can be cut.

Moreover, in accordance with the display apparatus 20, the concave mirror as the second optical surface 113*a* is not exposed. Therefore, damage, pealing, and the like to the concave mirror can be prevented.

11. Display Apparatus According to Third Embodiment of Present Technology

Figure 10:
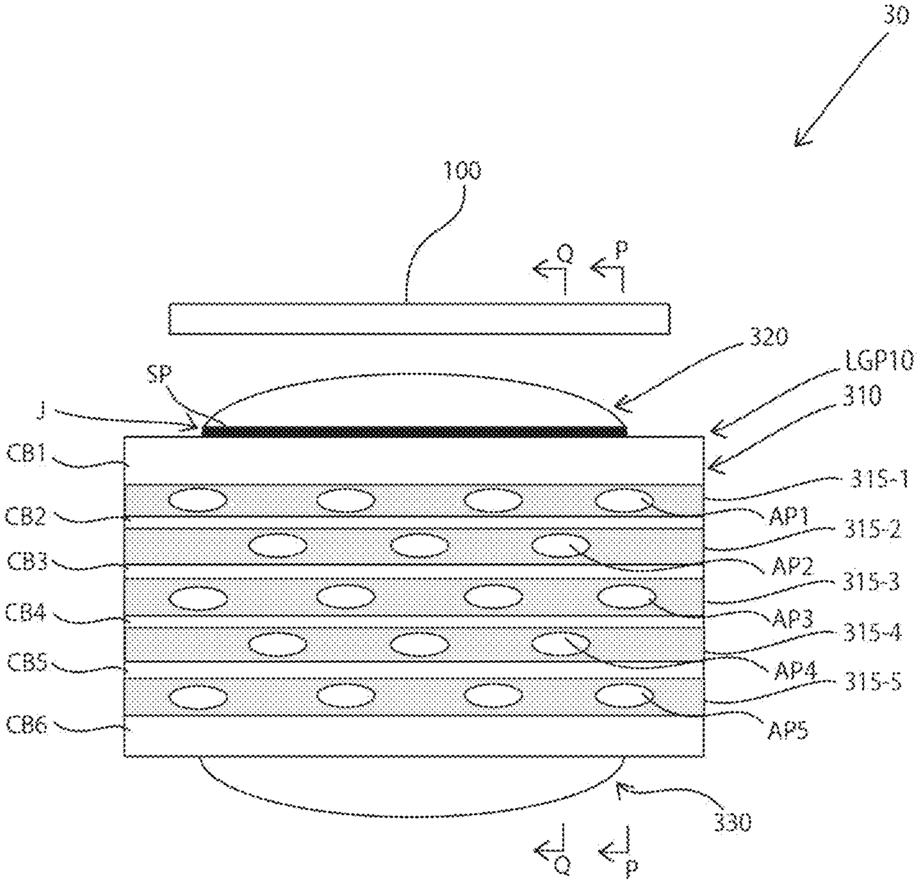
FIG. 10 A see-through side view schematically showing a configuration of a display apparatus according to a third embodiment of the present technology.
Figure 11A:
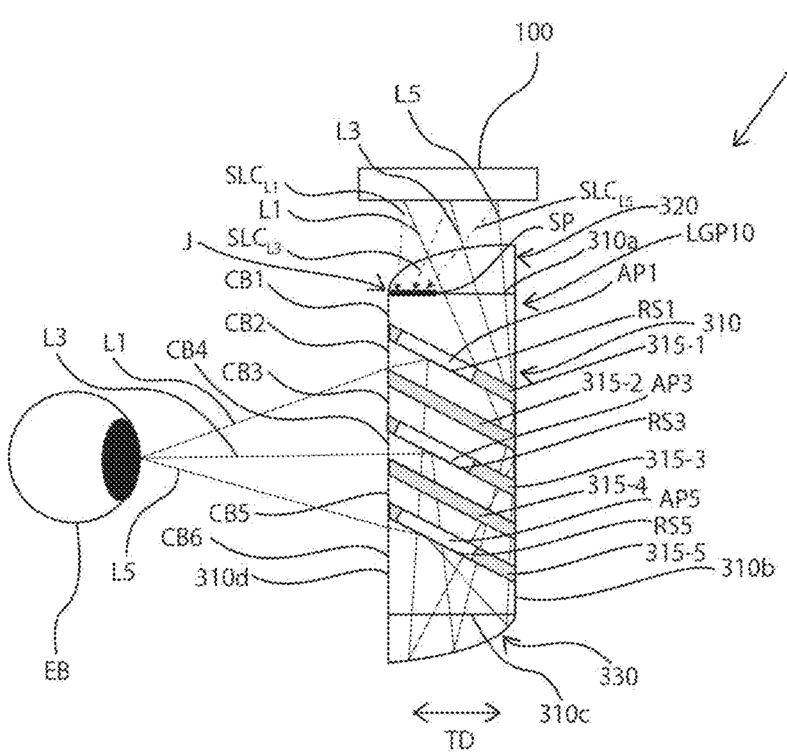
FIGS. 11A and 11B are cross-sectional views schematically showing the configuration of the display apparatus according to the third embodiment of the present technology (Part 1 and Part 2).
Figure 11B:
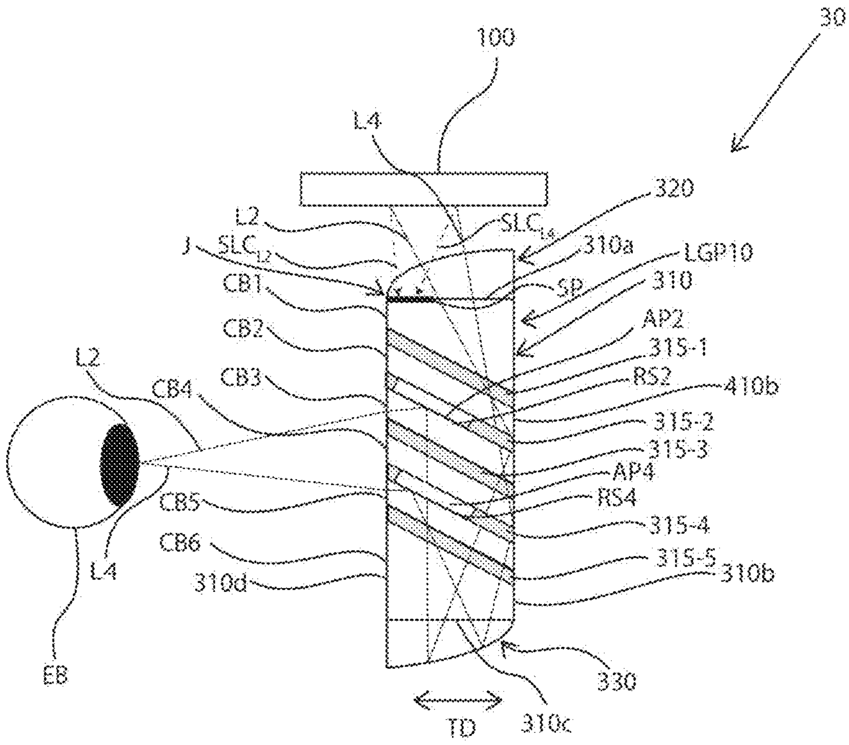

Hereinafter, a display apparatus 30 according to a third embodiment 1 will be described with reference to FIGS. 10, 11A, and 11B. FIG. 10 is a see-through side view of the display apparatus 30. FIG. 11A is a cross-sectional view taken along the line P-P in FIG. 10. FIG. 11B is a cross-sectional view taken along the line Q-Q in FIG. 10.

As shown in FIG. 10, of FIG. 11A, and FIG. 11B, the display apparatus 30 includes an image light generation apparatus 100 and a light guide plate LGP10.

The light guide plate LGP10 includes a light guide plate main body 310, an incident lens 320 that is joined to a light incident surface 310*a* that is one end surface of the light guide plate main body 310 and allows light beams contained in the image light from the image light generation apparatus 100 to enter the light incident surface 310*a*, and a concave mirror 330 that is joined to another end surface 310*c* of the light guide plate main body 310 and reflects light beams contained in image light entering it toward reflection surfaces RS (e.g., RS1 to RS5). One side surface in the thickness direction of the light guide plate main body 310 is a total internal reflection surface 310*b* that totally internally reflects light beams contained in the image light via the incident lens 320 and the light incident surface 310*a* toward the concave mirror 330. The concave mirror 330 collects and reflects light beams entering it toward the reflection surfaces RS. The light beams reflected on the reflection surfaces RS enter the eyeball EB via a light emission surface 310*d* that is another side surface in the thickness direction of the light guide plate main body 310.

In the light guide plate LGP10, the light-shielding portion SP is provided at a position on a joining portion J between the incident lens 320 and the light guide plate main body 310, which is deviated from the optical paths of the plurality of light beams (e.g., the light beams L1 to L5) contained in the image light from the image light generation apparatus 100.

The light-shielding portion SP in the light guide plate LGP10 shields, for example, the stray light component $SLC_{L1}$ of the light beam L1, the stray light component $SLC_{L2}$ of the light beam L2, the stray light component $SLC_{L3}$ of the light beam L3, the stray light component $SLC_{L4}$ of the light beam L4, and the stray light component $SLC_{L5}$ of the light beam L5.

The light guide plate main body 310 includes a plurality of stacked constituent members CB (e.g., CB1 to CB6). The plurality of constituent members CB is stacked in a direction tilting with respect to the thickness direction of the light guide plate main body 310. Each constituent member CB is, as an example, a flat plate member made of glass or resin. It should be noted that each constituent member CB is required to have high parallelism for retaining the resolving power both in a sole state and in a stacked state, and therefore it is favorable that each constituent member CB is made of glass which provides a favorable machining precision.

The constituent member CB1 and the constituent member CB2 are joined to each other via an adhesive layer 315-1. The adhesive layer 315-1 has an aperture AP1 opened to the side of the constituent member CB1 and the side of the constituent member CB2.

The constituent member CB2 and the constituent member CB3 are joined to each other via an adhesive layer 315-2. The adhesive layer 315-2 has an aperture AP2 opened to the side of the constituent member CB2 and the side of the constituent member CB3.

The constituent member CB3 and the constituent member CB4 are joined to each other via an adhesive layer 315-3. The adhesive layer 315-3 has an aperture AP3 opened to the side of the constituent member CB3 and the side of the constituent member CB4.

The constituent member CB4 and the constituent member CB5 are joined to each other via an adhesive layer 315-4. The adhesive layer 315-4 has an aperture AP4 opened to the side of the constituent member CB4 and the side of the constituent member CB5.

The constituent member CB5 and the constituent member CB6 are joined to each other via an adhesive layer 315-5. The adhesive layer 315-5 has an aperture AP5 opened to the side of the constituent member CB5 and the side of the constituent member CB6.

Here, the image light enters the light guide plate main body 310 from the light incident surface 310*a*. An interface between a constituent member CB of the two constituent members CB joined to each other, which is further from the light incident surface 310*a*, and the apertures AP as an air layer is the reflection surface RS.

To be specific, the interface between the constituent member CB2 and the aperture AP1 is the reflection surface RS1 (see FIG. 11A). The interface between the constituent member CB3 and the apertures AP2 is the reflection surface RS2 (see FIG. 11B). The interface between the constituent member CB4 and the apertures AP3 is the reflection surface RS3 (see FIG. 11A). The interface between the constituent member CB5 and the apertures AP4 is the reflection surface RS4 (see FIG. 11B). The interface between the constituent member CB6 and the apertures AP5 is the reflection surface RS5 (see FIG. 11A).

The reflection surfaces RS1 to RS5 are respectively provided corresponding to the light beams L1 to L5 contained in the image light.

It is favorable that both the one side surface and the other side surface in the thickness direction of each constituent member CB are as flat as possible. Accordingly, the flatness of each reflection surface RS and the parallelism between the reflection surfaces RS can be increased as much as possible.

As it can be seen from FIGS. 10, 11A, and 11B, the plurality of apertures AP is arranged in a staggered manner as a whole as viewed from the side of the side surface of the light guide plate main body 310.

To be specific, the apertures AP1, AP3, and AP5 are arranged in a direction orthogonal to the thickness direction of the light guide plate main body 310 and the apertures AP2 and AP4 are arranged in a direction orthogonal to the thickness direction of the light guide plate main body 310.

By making an arrangement in which the apertures AP and the reflection surfaces RS are horizontally deviated in every other adhesive layer in this manner, respective light beams reflected on the concave mirror 330 can guided to the corresponding reflection surfaces RS on paths on which they do not enter the reflection surfaces RS not corresponding thereto.

The larger the angle of reflection of a light beam on the reflection surface RS is, the smaller the angle of tilt of the reflection surface RS with respect to the total internal reflection surface 310*b* and the light emission surface 310*d* is. Light more easily passes through the light guide plate LGP10, and therefore an image on the reflection surface RS is less remarkable.

In accordance with the display apparatus 30 according to the third embodiment, effects similar to those of the display apparatuses according to the first and second embodiments are provided and the light-shielding portion SP is provided at the joining portion J between the incident lens 320 and the light guide plate main body 310. Therefore, the light-shielding portion SP can be easily arranged in the light guide plate LGP10.

It should be noted that in the third embodiment, a metal film or a dielectric multi-layer film may be deposited as the reflection surface RS on each of the plurality of constituent members constituting the light guide plate main body.

By the way, as shown in FIG. 11A and FIG. 11B, in order to cause the image light (image display light) via the incident lens 320 to enter the total internal reflection surface 310*b* of the light guide plate main body 310 within a predetermined angle-of-incidence range, a side end surface of the incident lens 320 needs to be parallel (favorably flush) with the total internal reflection surface 310*b* of the light guide plate main body 310. That is, the distance between the incident lens 320 and the light guide plate main body 310 needs to be substantially constant.

Hereinafter, display apparatuses according to Modified Examples 1 to 3 of the third embodiment that enable the distance between the incident lens 320 and the light guide plate main body 310 to be substantially constant will be described.

12. Display Apparatus According to Modified Example 1 of Third Embodiment of Present Technology Hereinafter, a display apparatus according to Modified Example 1 of the third embodiment of the present technology will be described with reference to FIG. 12.

Figure 12:
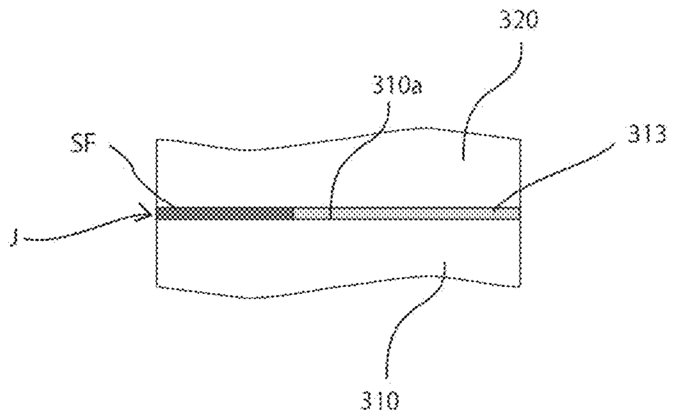
FIG. 12 A cross-sectional view showing a portion of a display apparatus according to Modified Example 1 of the third embodiment of the present technology.

As shown in FIG. 12, in the display apparatus according to Modified Example 1 of the third embodiment, a light-shielding film SF as the light-shielding portion is arranged in a portion between the light incident surface 310*a* and the incident lens 320 and an adhesive layer 313 is arranged in another portion between the light incident surface 310*a* and the incident lens 320.

To be specific, in the display apparatus according to Modified Example 1, the light-shielding film SF and the adhesive layer 313 are arranged side by side in the joining portion J. The light-shielding film SF and the adhesive layer 313 have substantially the same thickness.

Let's describe a joining method therefor briefly. For example, after the light-shielding film SF is attached to one of the incident lens 320 and the light guide plate main body 310, an adhesive to be the adhesive layer 313 is applied to a surface joined to the other of the incident lens 320 and the light guide plate main body 310 (surface to which no light-shielding film is attached) and the incident lens 320 and the light guide plate main body 310 are joined to each other via the light-shielding film SF and the adhesive layer 313 with the adhesive.

In accordance with the display apparatus according to Modified Example 1, the incident lens 320 and the light guide plate main body 310 can be joined to each other by a simple method.

13. Display Apparatus According to Modified Example 2 of Third Embodiment of Present Technology Hereinafter, a display apparatus according to Modified Example 2 of the third embodiment of the present technology will be described with reference to FIG. 13.

Figure 13:
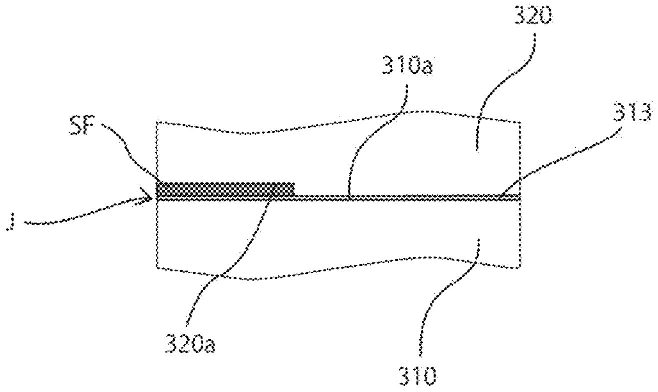
FIG. 13 A cross-sectional view showing a portion of a display apparatus according to Modified Example 2 of the third embodiment of the present technology.

As shown in FIG. 13, in the display apparatus according to Modified Example 2 of the third embodiment, the light-shielding film SF as the light-shielding portion is arranged in a cutout-shaped recess 320*a* provided in a surface of the incident lens 320 on the side of the light incident surface 310*a*, and the adhesive layer 313 is arranged between a surface in the periphery of the recess 320*a* in the surface on the side of the light incident surface 310*a* and the light-shielding film SF and the light incident surface 310*a*.

To be specific, in the display apparatus according to Modified Example 2, the surface on the side of the light incident surface 310*a* of the light-shielding film SF arranged in the recess 320*a* is substantially flush with the surface in the periphery of the recess 320*a* of the incident lens 320, and the incident lens 320 and the light guide plate main body 310 are joined to each other, for example, via the adhesive layer 313 thinner than the light-shielding film SF.

Let's describe a joining method therefor briefly. For example, after the light-shielding film SF is attached to the recess 320*a* of the incident lens 320 and an adhesive to be the adhesive layer 313 is applied to the light incident surface 310*a*, a peripheral portion of the light-shielding film SF and the recess 320*a* of the incident lens 320 and the light incident surface 310*a* are joined to each other with the adhesive.

In accordance with the display apparatus according to Modified Example 2, the adhesive layer 313 arranged on the optical path of the image display light between the incident lens 320 and the light guide plate main body 310 can be made thinner. Therefore, influences on the image quality of the display image can be reduced.

It should be noted that although in the display apparatus according to Modified Example 2, the recess in which the light-shielding film SF is arranged is formed in the incident lens 320, the recess may be formed in the light guide plate main body 310. Moreover, the recess is not limited to the cutout-shape and may be a hole shape.

Figure 14:
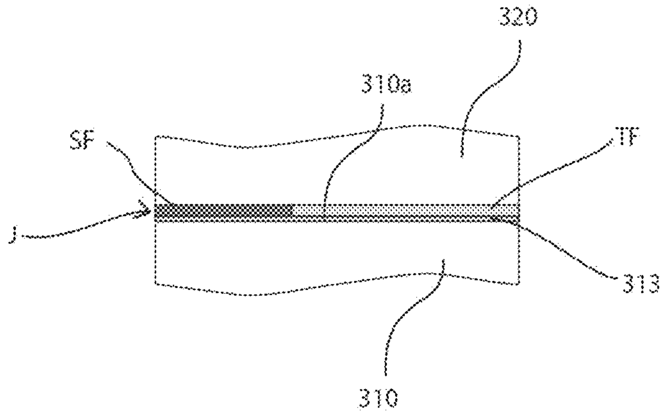
FIG. 14 A cross-sectional view showing a portion of the display apparatus according to Modified Example 3 of the third embodiment of the present technology.

14. Display Apparatus According to Modified Example 3 of Third Embodiment of Present Technology Hereinafter, a display apparatus according to Modified Example 3 of the third embodiment of the present technology will be described with reference to FIG. 14.

In the display apparatus according to Modified Example 3 of the third embodiment, a light-shielding film SF as the light-shielding portion is arranged in a portion between the light incident surface 310*a* and the incident lens 320, a light-transmitting film TF (e.g., a transparent film) is arranged in another portion between the light incident surface 310*a* and the incident lens 320, and an adhesive layer 313 is arranged between the light-shielding film SF and the light-transmitting film TF and the light incident surface 310*a*.

To be specific, in the display apparatus according to Modified Example 3, the light-shielding film SF as the light-shielding portion SP and the light-transmitting film TF having substantially the same thickness as the light-shielding film SF are arranged side by side in the joining portion J and the light-shielding film SF and the light-transmitting film TF and the light incident surface 310*a* are joined to each other, for example, via the adhesive layer 313 thinner than the light-shielding film SF.

Let's describe a joining method therefor briefly. For example, after the light-shielding film SF and the light-transmitting film TF are attached to one of the incident lens 320 and the light guide plate main body 310 and an adhesive to be the adhesive layer 313 is applied to a surface joined to the other of the incident lens 320 and the light guide plate main body 310, the incident lens 320 and the light guide plate main body 310 are joined to each other via the light-shielding film SF and the light-transmitting film TF with the adhesive.

In accordance with the display apparatus according to Example 3, the light-shielding film SF and the light-transmitting film TF are arranged side by side between the incident lens 320 and the light guide plate main body 310 and the adhesive layer 313 is thin. Therefore, the rigidity of the joining portion J can be increased and the incident lens 320 can be prevented from falling down.

It should be noted that in the display apparatus according to Example 3, the adhesive layer 313 may be arranged between the light-shielding film SF and the light-transmitting film TF and the incident lens 320, not or also between the light-shielding film SF and the light-transmitting film TF and the light guide plate main body 310.

Figure 15:
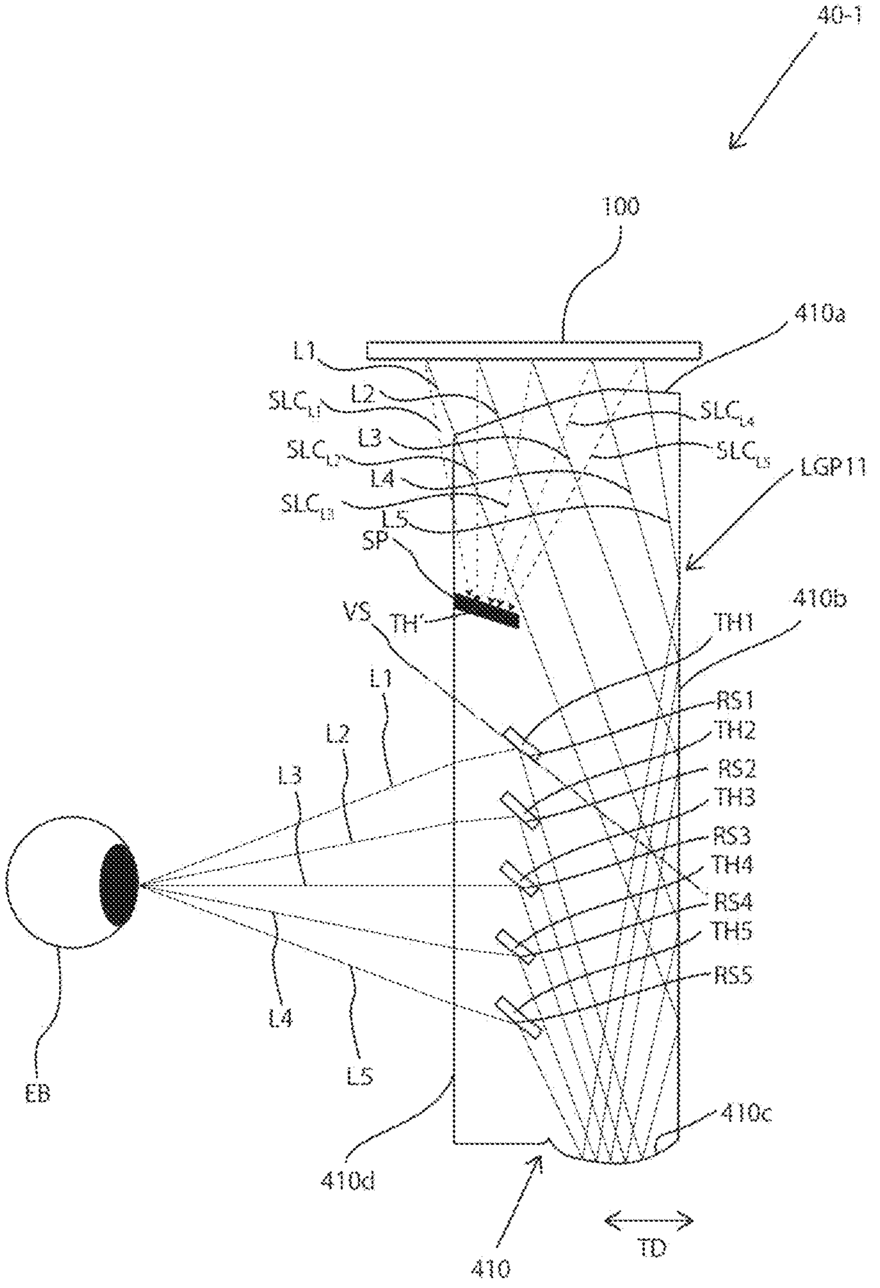
FIG. 15 A cross-sectional view schematically showing a configuration of a display apparatus according to Example 1 of a fourth embodiment of the present technology.

15. Display Apparatus According to Example 1 of Fourth Embodiment of Present Technology Hereinafter, a display apparatus 40-1 according to Example 1 of a fourth embodiment will be described with reference to FIG. 15. FIG. 15 is a cross-sectional view of the display apparatus 40-1.

As shown in FIG. 15, in a light guide plate LGP11 of the display apparatus 40-1 according to Example 1 of the fourth embodiment, a light guide plate main body 410 consists of a single member. Through-holes TH (e.g., TH1 to TH5) are provided in the light guide plate main body 410. Interfaces between the light guide plate main body 410 and the through-holes TH are reflection surfaces RS (e.g., RS1 to RS5). Another through-hole TH' is provided in the light guide plate main body 410. A light-shielding portion SP is arranged in the other through-hole TH'. In the display apparatus 40-1, the arrangement of the light-shielding portion SP is similar to the arrangement of the light-shielding portion SP in the display apparatus 10-1 according to Example 1 of the first embodiment.

The through-holes TH penetrate a pair of end surfaces of the light guide plate main body 410, which are opposite to each other. The through-holes TH (e.g., TH1 to TH5) are tilted with respect to the thickness direction TD of the light guide plate main body 410.

It should be noted that the light guide plate main body 410 may have holes penetrating one of the pair of end surfaces opposite to each other instead of the through-holes TH. In this case, interfaces between these holes and the light guide plate main body 410 can be used as the reflection surfaces RS.

In accordance with the display apparatus 40-1 according to Example 1, the light guide plate main body 410 consists of a single member. Therefore, as compared to a case where the light guide plate main body 410 consists of a plurality of members, no joining portion is provided. Therefore, if stray light components are generated, generation of a ghost image (ghost light) due to dispersion of these stray light components is suppressed.

Figure 16:
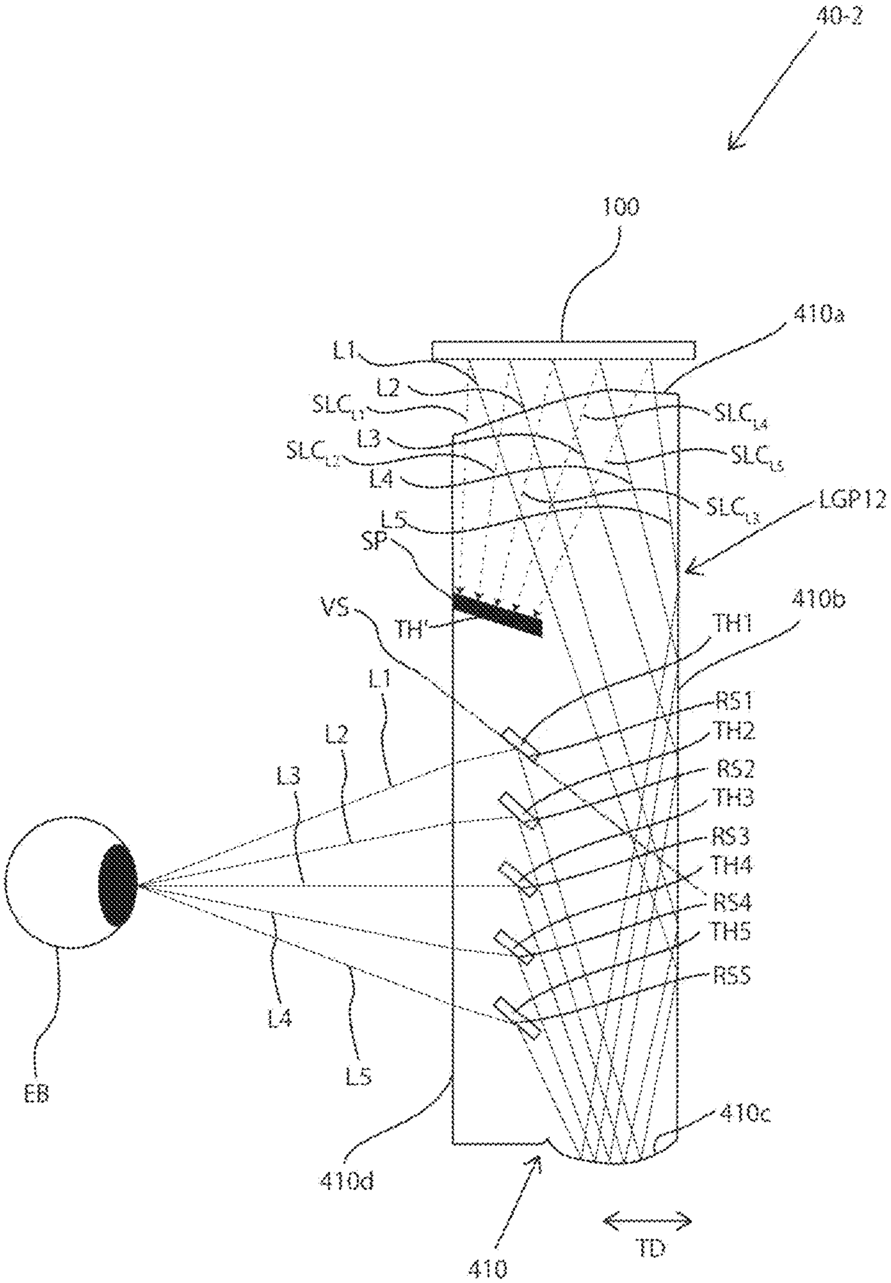
FIG. 16 A cross-sectional view schematically showing a configuration of a display apparatus according to Example 2 of the fourth embodiment of the present technology.

16. Display Apparatus According to Example 2 of Fourth Embodiment of Present Technology Hereinafter, a display apparatus 40-2 according to Example 2 of the fourth embodiment will be described with reference to FIG. 16. FIG. 16 is a cross-sectional view of the display apparatus 40-2.

The display apparatus 40-2 according to Example 2 of the fourth embodiment has configurations similar to those of the display apparatus 40-1 according to Example 1 except for the fact that a portion of the light-shielding portion SP is located between a light incident surface 410*a* and a reflection surface RS1.

In accordance with the display apparatus 40-2 according to Example 2, effects similar to those of the display apparatus 40-1 according to Example 1 are provided and further unwanted stray light components of the image light can be shielded by the light-shielding portion SP.

17. Modified Examples of Present Technology

The display apparatus according to the present technology is not limited to the configurations described in the above-mentioned respective embodiments, and can be modified as appropriate without departing from the gist.

For example, in the above-mentioned respective embodiments (excluding Example 8 of the first embodiment), the light-shielding portion SP is provided at the position between the virtual surface VS including the reflection surface RS and the light incident surface inside the light guide plate main body, though not limited thereto. The light-shielding portion SP may be provided at any position inside the light guide plate main body as long as it is a position that shields stray light components of the image light via the light incident surface and is a position that does not shield the image display light.

For example, in each of the above-mentioned embodiments, the interfaces between the light guide plate main body and the air layer (e.g., apertures, through-holes, holes, or the like) provided inside the light guide plate main body are the reflection surface RS, though not limited thereto. For example, interfaces between the light guide plate main body and liquid layers, solid layers, or the like having refractive index lower than that of the light guide plate main body, which are provided inside the light guide plate main body, may be the reflection surfaces RS. For example, a metal film or a dielectric multi-layer film provided inside the light guide plate main body may be the reflection surface RS.

For example, although in each of the above-mentioned embodiments, the plurality of reflection surfaces RS is provided in the light guide plate main body, a single reflection surface may be provided.

The configurations of the above-mentioned respective embodiments may be combined with each other in a reasonable range.

Moreover, the present technology can also take the following configurations.

(1) A display apparatus, including:
- an image light generation apparatus that generates image light; and
- a light guide plate that guides the image light from the image light generation apparatus to an eyeball, in which
- the light guide plate includes
  - a light guide plate main body including
    - a light incident surface upon which the image light enters, and
    - an optical surface group including a plurality of optical surfaces that guides the image light via the light incident surface,
  - at least one reflection surface that is provided inside the light guide plate main body and reflects the image light via the optical surface group to a side of the eyeball, and
  - at least one light-shielding portion that is provided in the light guide plate main body and shields a stray light component of the image light.

(2) The display apparatus according to (1), in which
- the light-shielding portion is provided inside the light guide plate main body.

(3) The display apparatus according to (1) or (2), in which
- the light-shielding portion is located between a virtual surface and the light incident surface, the virtual surface including the reflection surface.

(4) The display apparatus according to any one of (1) to (3), in which
- the stray light component is light of the image light, the light excluding light that is guided to the reflection surface via the light incident surface and the optical surface group.

(5) The display apparatus according to any one of (1) to (4), in which
- the light-shielding portion is located at a position deviated from an optical path of the image light between the light incident surface and the optical surface group.

(6) The display apparatus according to any one of (1) to (5), in which
- at least a portion of the light-shielding portion is located between the light incident surface and the reflection surface.

(7) The display apparatus according to any one of (1) to (6), in which the light-shielding portion is provided at least on a back side of the reflection surface.

(8) The display apparatus according to any one of (1) to (7), in which the plurality of optical surfaces includes a first optical surface that totally internally reflects the image light via the light incident surface, and a second optical surface that faces the light incident surface and bends the image light totally internally reflected on the first optical surface toward the reflection surface.

(9) The display apparatus according to (8), in which the stray light component is light of the image light, the light excluding light that enters the first optical surface via the light incident surface within a predetermined angle-of-incidence range satisfying a total internal reflection condition.

(10) The display apparatus according to (8) or (9), in which the light-shielding portion is located at a position deviated from an optical path of the image light between the light incident surface and the first optical surface.

(11) The display apparatus according to any one of (8) to (10), in which the at least one reflection surface is a plurality of reflection surfaces arranged between the light incident surface and the second optical surface in a direction in which the light incident surface and the second optical surface face each other, and the light-shielding portion is located between a virtual surface and the light incident surface, the virtual surface including a reflection surface closest to the light incident surface among the plurality of reflection surfaces.

(12) The display apparatus according to any one of (8) to (11), in which the light guide plate main body further includes a light emission surface that faces the first optical surface and emits the image light via the reflection surface toward the eyeball, and the light-shielding portion is provided at a position closer to the light emission surface than the first optical surface.

(13) The display apparatus according to any one of (8) to (12), in which the light guide plate main body is constituted by a plurality of joined members including first and second members, and the reflection surface and the light-shielding portion are provided in a joining portion of the first and second members.

(14) The display apparatus according to any one of (8) to (13), in which the light guide plate main body is constituted by a plurality of joined members including first and second members, the reflection surface is provided in a first joining portion of the first and second members, at least a portion of the light-shielding portion is provided in a second joining portion of the first and second members, and the second joining portion is located between the light incident surface and the first joining portion.

(15) The display apparatus according to any one of (8) to (14), in which the light guide plate main body is constituted by a plurality of joined members including first and second members, the reflection surface is provided in a first joining portion of the first and second members, at least a portion of the light-shielding portion is provided between the first joining portion and the second joining portion of the first and second members, and the second joining portion is located between the light incident surface and the first joining portion.

(16) The display apparatus according to (13), in which the second member includes the light incident surface and the first and second optical surfaces, and in the joining portion, joining surfaces of the first and second members which face the light incident surface are joined to each other via the light-shielding portion.

(17) The display apparatus according to (13), in which the plurality of members includes a third member, the third member being joined to the second member and having the second optical surface, the second member includes the light incident surface and the first optical surface, and in the joining portion, joining surfaces of the first and second members which face the light incident surface are joined to each other via the light-shielding portion.

(18) The display apparatus according to any one of (8) to (17), in which the second optical surface is a concave mirror.

(19) The display apparatus according to any one of (1) to (18), in which the reflection surface is a plane surface.

(20) The display apparatus according to any one of (1) to (19), in which the light-shielding portion absorbs at least a portion of the stray light component entering the light-shielding portion.

(21) The display apparatus according to any one of (1) to (20), in which the light-shielding portion includes paint.

(22) The display apparatus according to any one of (1) to (20), in which the light-shielding portion includes a metal thin film.

(23) The display apparatus according to any one of (1) to (22), in which the light-shielding portion includes a light-shielding film.

(24) The display apparatus according to (23), in which the light guide plate further includes an incident lens, the incident lens being joined to the light incident surface and allowing the image light to enter the light guide plate main body, the light-shielding film is arranged in a portion between the light incident surface and the incident lens, and an adhesive layer is arranged in another portion between the light incident surface and the incident lens.

(25) The display apparatus according to (23), in which the light guide plate further includes an incident lens, the incident lens being joined to the light incident surface and allowing the image light to enter the light guide plate main body, the light-shielding film is arranged in a recess provided in a surface of the incident lens on a side of the light incident surface or in the light incident surface, and an adhesive layer is arranged between a surface in a periphery of the recess of one of the surface on the side of the light incident surface and the light incident surface, in which the recess is provided, and the light-shielding film and the other of the surface on the side of the light incident surface and the light incident surface, in which the recess is not provided.

(26) The display apparatus according to (23), in which the light guide plate further includes an incident lens, the incident lens being joined to the light incident surface and allowing the image light to enter the light guide plate main body, the light-shielding film is arranged in a portion between the light incident surface and the incident lens, a light-transmitting film is arranged in another portion between the light incident surface and the incident lens, and an adhesive layer is arranged between the light-shielding film and the light-transmitting film and the light incident surface and/or between the light-shielding film and the light-transmitting film and the incident lens.

(27) The display apparatus according to (1), in which the light-shielding portion is provided in the light incident surface.

REFERENCE SIGNS LIST

10-1 to 10-8, 20, 30, 40-1, 40-2: display apparatus, 110, 110-2, 310, 410: light guide plate main body, 111: first member, 112: second member, 113: third member, 100: image light generation apparatus, 110*a*, 310*a*, 410*a*: light incident surface, 110*b*, 310*b*, 410*b*: first optical surface 110*c*, 113*a*, 310*c*, 410*c*: second optical surface 110*d*, 310*d*, 410*d*: light emission surface, 313: adhesive layer, 320: incident lens, 320*a*: recess, SP: light-shielding portion, SF: light-shielding film, TF: light-transmitting film, SP1: first light-shielding portion (light-shielding portion), SP2: second light-shielding portion (light-shielding portion), VS: virtual surface, LGP1 to LGP12: light guide plate, $SIC_{L1}$ to $SLC_{L5}$: stray light components, EB: eyeball, RS (RS1 to RS5): reflection surface, L1 to L5: light beams included in image light, J: joining portion, J1: first joining portion, J2: second joining portion.

The invention claimed is:

1. A display apparatus, comprising:

an image light generation apparatus configured to generate image light; and a light guide plate configured to guide the image light from the image light generation apparatus to an eyeball, wherein the light guide plate includes:

a light guide plate main body including:

a light incident surface, wherein the image light enters the light guide plate main body via the light incident surface, and an optical surface group including a plurality of optical surfaces, wherein the plurality of optical surfaces is configured to guide the image light via the light incident surface;

at least one reflection surface inside the light guide plate main body, wherein the at least one reflection surface is configured to reflect the image light via the optical surface group to a side of the eyeball; and at least one light-shielding portion inside the light guide plate main body, wherein the at least one light-shielding portion is configured to shield a stray light component of the image light, and the plurality of optical surfaces includes:

a first optical surface configured to totally internally reflect the image light via the light incident surface, and a second optical surface that faces the light incident surface, wherein the second optical surface is configured to bend the image light totally internally reflected on the first optical surface toward the at least one reflection surface.

2. The display apparatus according to claim 1, wherein the at least one light-shielding portion is between a virtual surface and the light incident surface, and the virtual surface includes the at least one reflection surface.

3. The display apparatus according to claim 1, wherein the stray light component of the image light excludes light of the image light guided to the at least one reflection surface via the light incident surface and the optical surface group.

4. The display apparatus according to claim 1, wherein the at least one light-shielding portion is at a position deviated from an optical path of the image light between the light incident surface and the optical surface group.

5. The display apparatus according to claim 1, wherein at least a portion of the at least one light-shielding portion is between the light incident surface and the at least one reflection surface.

6. The display apparatus according to claim 1, wherein the at least one light-shielding portion is at least on a back side of the at least one reflection surface.

7. The display apparatus according to claim 1, wherein the stray light component of the image light excludes light of the image light that enters the first optical surface via the light incident surface within a specific angle-of-incidence range, and the specific angle-of-incidence range satisfies a total internal reflection condition.

8. The display apparatus according to claim 1, wherein the at least one light-shielding portion is at a position deviated from an optical path of the image light between the light incident surface and the first optical surface.

9. The display apparatus according to claim 1, wherein the light guide plate further includes a plurality of reflection surfaces, the plurality of reflection surfaces includes the at least one reflection surface, the plurality of reflection surfaces is between the light incident surface and the second optical surface in a specific direction, in the specific direction, the light incident surface faces the second optical surface, the at least one light-shielding portion is between a virtual surface and the light incident surface, and the virtual surface includes a reflection surface closest to the light incident surface among the plurality of reflection surfaces.

10. The display apparatus according to claim 1, wherein the light guide plate main body further includes a light emission surface that faces the first optical surface, the light emission surface is configured to emit the image light via the at least one reflection surface toward the eyeball, and the at least one light-shielding portion is at a position closer to the light emission surface than the first optical surface.

11. The display apparatus according to claim 1, wherein the light guide plate main body further includes a plurality of joined members, the plurality of joined members includes a first member and a second member, and the at least one reflection surface and the at least one light-shielding portion are in a joining portion of each of the first member and the second member.

12. The display apparatus according to claim 11, wherein the second member includes the light incident surface, the first optical surface, and the second optical surface,
in the joining portion, a joining surface of the first member is joined to a joining surface of the second member via the at least one light-shielding portion, and
each of the joining surface of the first member and the joining surface of the second member faces the light incident surface.

13. The display apparatus according to claim 11, wherein the plurality of joined members further includes a third member,
the third member is joined to the second member,
the third member has the second optical surface,
the second member includes the light incident surface and the first optical surface,
in the joining portion, a joining surface of the first member is joined to a joining surface of the second member via the at least one light-shielding portion, and
each of the joining surface of the first member and the joining surface of the second member faces the light incident surface.

14. The display apparatus according to claim 1, wherein the light guide plate main body further includes a plurality of joined members,
the plurality of joined members includes a first member and a second member,
the at least one reflection surface is in a first joining portion of each of the first member and the second member,
at least a portion of the at least one light-shielding portion is in a second joining portion of each of the first member and the second member, and
the second joining portion is between the light incident surface and the first joining portion.

15. The display apparatus according to claim 1, wherein the light guide plate main body further includes a plurality of joined members,
the plurality of joined members includes a first member and a second member,
the at least one reflection surface is in a first joining portion of each of the first member and the second member,
at least a portion of the at least one light-shielding portion is between the first joining portion and a second joining portion of each of the first member and the second member, and
the second joining portion is between the light incident surface and the first joining portion.

16. The display apparatus according to claim 1, wherein the second optical surface is a concave mirror.

17. The display apparatus according to claim 1, wherein the at least one reflection surface is a plane surface.

18. The display apparatus according to claim 1, wherein a portion of the stray light component enters the at least one light-shielding portion, and
the at least one light-shielding portion is further configured to absorb the entered portion of the stray light component.

19. The display apparatus according to claim 1, wherein the at least one light-shielding portion includes paint.

20. The display apparatus according to claim 1, wherein the at least one light-shielding portion includes a metal thin film.

21. The display apparatus according to claim 1, wherein the at least one light-shielding portion includes a light-shielding film.

22. The display apparatus according to claim 21, further comprising an adhesive layer, wherein
the light guide plate further includes an incident lens,
the incident lens is joined to the light incident surface,
the incident lens is configured to allow the image light to enter the light guide plate main body,
the light-shielding film is in a first portion between the light incident surface and the incident lens, and
the adhesive layer is in a second portion between the light incident surface and the incident lens.

23. The display apparatus according to claim 21, further comprising an adhesive layer, wherein
the light guide plate further includes an incident lens,
the incident lens is joined to the light incident surface,
the incident lens is configured to allow the image light to enter the light guide plate main body,
one of a first portion of a surface of the incident lens or a first portion of the light incident surface includes a recess,
the surface of the incident lens is on a side of the light incident surface,
the light-shielding film is in the recess,
the adhesive layer is between the light-shielding film and a surface in a periphery of the recess,
the recess is absent on each of a second portion of the surface of the incident lens and a second portion of the light incident surface, and
the adhesive layer is further between the second portion of the surface of the incident lens and the second portion of the light incident surface.

24. The display apparatus according to claim 21, further comprising a light-transmitting film and an adhesive layer, wherein
the light guide plate further includes an incident lens,
the incident lens is joined to the light incident surface,
the incident lens is configured to allow the image light to enter the light guide plate main body,
the light-shielding film is in a first portion between the light incident surface and the incident lens,
the light-transmitting film is in a second portion between the light incident surface and the incident lens, and
the adhesive layer is between at least one of
the light incident surface and each of the light-shielding film and the light-transmitting film, or
the incident lens and each of the light-shielding film and the light-transmitting film.

25. The display apparatus according to claim 1, wherein the at least one light-shielding portion is on the light incident surface.

26. A display apparatus, comprising:
an image light generation apparatus configured to generate image light;
a light guide plate configured to guide the image light from the image light generation apparatus to an eyeball, wherein
the light guide plate includes:
a light guide plate main body including:
a light incident surface, wherein the image light enters the light guide plate main body via the light incident surface, and
an optical surface group including a plurality of optical surfaces, wherein the plurality of optical surfaces is configured to guide the image light via the light incident surface;

at least one reflection surface inside the light guide plate main body, wherein the at least one reflection surface is configured to reflect the image light via the optical surface group to a side of the eyeball;

at least one light-shielding portion in the light guide plate main body, wherein the at least one light-shielding portion is configured to shield a stray light component of the image light; and an incident lens joined to the light incident surface, the incident lens is configured to allow the image light to enter the light guide plate main body, the at least one light-shielding portion includes a light-shielding film, and the light-shielding film is in a first portion between the light incident surface and the incident lens; and an adhesive layer in a second portion between the light incident surface and the incident lens.

* * * * *